(12) United States Patent
Omote et al.

(10) Patent No.: US 8,908,830 B2
(45) Date of Patent: Dec. 9, 2014

(54) SURFACE MICROSTRUCTURE MEASUREMENT METHOD, SURFACE MICROSTRUCTURE MEASUREMENT DATA ANALYSIS METHOD AND X-RAY SCATTERING MEASUREMENT DEVICE

(75) Inventors: Kazuhiko Omote, Tokyo (JP); Yoshiyasu Ito, Tokyo (JP)

(73) Assignee: Rigaku Corporation, Akishima-Shi (JP)

( * ) Notice: Subject to any disclaimer, the term of this patent is extended or adjusted under 35 U.S.C. 154(b) by 499 days.

(21) Appl. No.: 13/264,222

(22) PCT Filed: Apr. 12, 2010

(86) PCT No.: PCT/JP2010/056542
§ 371 (c)(1),
(2), (4) Date: Oct. 31, 2011

(87) PCT Pub. No.: WO2010/119844
PCT Pub. Date: Oct. 21, 2010

(65) Prior Publication Data
US 2012/0087473 A1    Apr. 12, 2012

(30) Foreign Application Priority Data

Apr. 14, 2009 (JP) .................................. 2009-097606

(51) Int. Cl.
G01B 15/04 (2006.01)
(52) U.S. Cl.
CPC ..................................... G01B 15/04 (2013.01)
USPC ........................................................ 378/86
(58) Field of Classification Search
CPC .......................................... G01N 23/00–23/20
USPC .................... 378/70–71, 84–86, 89
See application file for complete search history.

(56) References Cited

U.S. PATENT DOCUMENTS

| 5,442,676 A | 8/1995 | Fewster |
| 6,920,200 B2 | 7/2005 | Ito et al. |

(Continued)

FOREIGN PATENT DOCUMENTS

| JP | 6-160312 A | 6/1994 |
| JP | 6-229950 A | 8/1994 |

(Continued)

OTHER PUBLICATIONS

Lazzari, IsGISAXS: a tool for Grazing Incidence Small Angle X-ray Scattering analysis for nanostructures Version 2.6, 2006 available at http://ln-www.insp.upmc.fr/axe4/Oxydes/IsGISAXS/figures/doc/manual.html.*

(Continued)

Primary Examiner — Toan Ton
Assistant Examiner — John Corbett
(74) Attorney, Agent, or Firm — Birch, Stewart, Kolasch & Birch, LLP

(57) ABSTRACT

There is provided a surface microstructure measurement method, a surface microstructure measurement data analysis method, and an X-ray scattering measurement device which can accurately measure a microstructure on a surface and which can evaluate a three-dimensional structural feature. In the surface microstructure measurement method, the specimen surface is irradiated with X-ray at a grazing incident angle and a scattering intensity is measured; a specimen model with a microstructure on a surface in which one or more layers is formed in a direction perpendicular to the surface and unit structures are periodically arranged in a direction parallel to the surface within the layers is assumed; a scattering intensity of X-ray scattered by the microstructure is calculated in consideration of effects of refraction and reflection caused by the layer; and the scattering intensity of X-ray calculated by the specimen model is fitted to the measured scattering intensity. Then, as a result of the fitting, an optimum value of a parameter for specifying the shape of the unit structures is determined. Therefore, it is possible to accurately measure a microstructure.

15 Claims, 30 Drawing Sheets

(56) References Cited

U.S. PATENT DOCUMENTS

| | | | |
|---|---|---|---|
| 7,039,161 | B2 | 5/2006 | Ito et al. |
| 7,130,373 | B2 | 10/2006 | Omote et al. |
| 7,440,105 | B2 | 10/2008 | Adel et al. |
| 7,619,737 | B2 | 11/2009 | Mos et al. |
| 2003/0197872 | A1 | 10/2003 | Littau et al. |
| 2004/0066893 | A1 | 4/2004 | Ito et al. |
| 2005/0105686 | A1 | 5/2005 | Ito et al. |
| 2005/0195398 | A1 | 9/2005 | Adel et al. |
| 2005/0220267 | A1 | 10/2005 | Omote et al. |
| 2006/0133570 | A1 | 6/2006 | Mazor et al. |
| 2008/0174753 | A1 | 7/2008 | Mos et al. |
| 2008/0273662 | A1* | 11/2008 | Yun et al. ............ 378/74 |

FOREIGN PATENT DOCUMENTS

| | | |
|---|---|---|
| JP | 11-30511 A | 2/1999 |
| JP | 2003-202305 A | 7/2003 |
| JP | 2005-121613 A | 5/2005 |
| JP | 2005-214712 A | 8/2005 |
| JP | 2005-523581 A | 8/2005 |
| JP | 2006-170791 A | 6/2006 |
| JP | 2007-527531 A | 9/2007 |
| JP | 2007-285923 A | 11/2007 |
| JP | 2008-177567 A | 7/2008 |

OTHER PUBLICATIONS

Baumbach et al., Grazing incidence diffraction by laterally patterned semiconductor nanostructures, 1999, J. Phys. D.: Appl Phys., vol. 32, pp. 726-740.*

Jinhwan Yoon, et al. "Nondestructive quantitative synchrotron grazing incidence X-ray scattering analysis of cylindrical nanostructures in supported thin films", Journal of Applied Crystallography, IUCr, Apr. 2007, vol. 40, Part 2, pp. 305-312.

Partial translation of JP Office Action issued in JP Patent Application No. 2011-509284 on Oct. 8, 2013.

Partial translation of Kazuhiko Omote, bunseki, Japan, Jan. 5, 2006, p. 2-8.

Remi Lazzari, "IsGISAXS: a program for grazing-incidence small-angle X-ray scattering analysis of supported islands", Journal of Applied Crystallography, IUCr, Aug. 2002, vol. 35, Part 4, pp. 406-421.

Ito et al., "Characterization of microfabricated structures by high resolution GISAXS", The Japan Society of Applied Physics, Extended Abstracts (The 53rd Spring Meeting, 2006), No. 3, 24-a-B-4, 17 pages, Mar. 24, 2006.

Ito et al., "Characterization of Submicron-scale Periodic Grooves by Grazing Incidence Ultra-small-angle X-ray Scattering", Japanese Journal of Applied Physics, vol. 46, No. 32, pp. L773-L775, 2007 (Published online Aug. 10, 2007).

* cited by examiner

SURFACE MICROSTRUCTURE MEASUREMENT METHOD, SURFACE MICROSTRUCTURE MEASUREMENT DATA ANALYSIS METHOD AND X-RAY SCATTERING MEASUREMENT DEVICE

TECHNICAL FIELD

The present invention relates to a surface microstructure measurement method, a surface microstructure measurement data analysis method and an X-ray scattering measurement device suitable for surface microstructure measurement.

BACKGROUND ART

In a semiconductor manufacturing process, transistors in an LSI are often formed by utilizing a line and space structure. FIG. 30 is a plan view showing an example of a semiconductor substrate 900. The semiconductor substrate 900 has a line and space structure composed of line portions 910 and space portions 920; transistor structures such as gate electrodes are fabricated into such a line and space structure. A gate length is an important parameter for determining the properties of a transistor, and the suppression of variations thereof to a predetermined value or less is a very important factor for determining the performance of an LSI. The minimum length in such an element structure is referred to as a CD (critical dimension). If transistors having significantly different properties such as a threshold voltage and a gate current are installed within a circuit, it is impossible to assure the performance of an LSI that is an aggregation thereof. In order to prevent the foregoing problem, it is necessary to constantly optimize semiconductor manufacturing process conditions.

Even in other processes, factors for changing the CD value of similar elements are constantly present. Therefore, in a wafer that is being actually manufactured, is it a very important issue to check the CD value at the right time. Conventionally, in the measurement of the CD of a semiconductor and the like, a CD-SEM or a light scattering analysis method (scatterometry) is used.

In contrast, there is proposed a technology for analyzing density fluctuation in a nonuniform density multilayer film where one or more nonuniform density films are stacked on a substrate through the use of a scattering function representing an X-ray scattering curve according to a parameter indicating the distribution state of particlelike material (for example, patent document 1).

In the nonuniform density multilayer film analyzing method disclosed in patent document 1, the scattering function representing the X-ray scattering curve according to the parameter indicating the distribution state of particlelike material is used. An X-ray scattering intensity is calculated under the same conditions as measurement conditions under which the X-ray scattering intensity is actually measured, fitting is performed between the X-ray scattering intensity calculated while a parameter is being changed and the actually measured X-ray scattering intensity, and the value of the parameter when the calculated X-ray scattering intensity agrees with the actually measured X-ray scattering intensity is set as the distribution state of particlelike material within the nonuniform density multilayer film. As described above, as the scattering function, through the use of a function introducing a transition probability, in which an exact solution of the multilayer film without scattering in an interface is set as an initial state and a final state, the distribution state of particlelike material within the nonuniform density multilayer film is analyzed.

In a method disclosed in patent document 2, in order to measure the critical dimension (CD), the surface of a substrate is irradiated with an X-ray beam so as to hit a region of a periodic structure on the surface of a specimen. Then, in order to measure the dimension of the structure parallel to the surface of the specimen, an X-ray pattern resulting from scattering corresponding to the feature of the surface is detected as the function of an azmuth parallel to the surface of the specimen. However, as the method of measuring the diffraction line of each order of the formed periodical structure, the rotation of the specimen itself in the direction of the azmuth is not explicitly indicated.

In contrast, non-patent document 1 disclosed before the disclosure of patent document 2 described above discloses that a high resolution measurement system is configured through the use of a mirror, a crystal collimator and an analyzer, a diffracted X-lay from a periodical structure formed on the surface is referred to as an in-plane X-ray small angle scattering pattern and is measured as the function of an azmuth. In the method disclosed here, the periodical structure is regarded as almost like crystal, a specimen is rotated in the direction of the azmuth such that the spectrum of each diffraction order satisfies the well-known Bragg diffraction conditions (in non-patent document 1, it is represented as φ), an extremely large number of diffraction peaks are detected, and based on it, the pitch and the line width of the periodical structure are determined with a high degree of accuracy. Furthermore, a method is disclosed in which, at the same time when the specimen is rotated in the direction of the azmuth, a detector is rotated at a speed twice as high as such a speed (in non-patent document 1, it is represented as 2θ/φ scan), and thus the Bragg diffraction conditions are satisfied.

Furthermore, non-patent document 2 proposes a structure model for theoretically calculating a scattered X-ray spectrum that is a function with reference to the direction of the measured azmuth (formula (2) in non-patent document 2). A method is disclosed in which, based on this, a scattered X-ray intensity is specifically calculated, a parameter is optimized by comparison with the measured scattered X-ray spectrum, a microstructure such as a line width and the inclination of a side wall is determined.

Patent document 1: Japanese Unexamined Patent Application Publication No. 2003-202305
Patent document 2: US patent Application Publication No. 2006/133570
Non-Patent document 1: Yoshiyasu ITO, Katsuhiko INABA, Kazuhiko OMOTE, Yasuo WADA, Tomokazu EZURA, Ken TSUTSUI, and Susumu IKEDA, "Evaluation of a Microfabricated Structure by an Ultra-high Resolution In-plane X-ray Small Angle Scattering Method," The 53th Applied Physics Related Discussion Meeting Preprint 24a-B-4/III, May 24, 2006, No. 3, p. 1471
Non-Patent document 2: Yoshiyasu ITO, Katsuhiko INABA, Kazuhiko OMOTE, Yasuo WADA, and Susumu IKEDA, Characterization of Submicron-scale Periodic Grooves by Grazing Incidence Ultra-small-angle X-ray Scattering, Japanese Journal of Applied Physics, Japan, The Japan Society of Applied Physics, Aug. 10, 2007, Vol. 46, No. 32, 2007, pp. L773-L775

DISCLOSURE OF THE INVENTION

Under such a situation, since these days the size of a structure unit in semiconductor manufacturing is significantly reduced, it is difficult to perform CD measurement. Although, for example, the beam size of a CD-SEM is said to be about 5 nm, it is not easy to measure 20 nm with this beam size.

Moreover, although, in the scatterometry, the wavelength of probe light is naturally reduced, in consideration of transmission of the light in the atmosphere, the wavelength is reduced to about 200 nm at most, and it is obvious that it will be difficult to perform the measurement in the future. As, in the future, the CD is reduced to 32 nm, to 25 nm and then to 20 nm, that is, as the generation advances, it is highly likely that these methods will not have sufficient sensitivity. Under the foregoing situation, if the CD measurement through the use of X-ray becomes possible, although not all the methods such as the scatterometry and the CD-SEM are replaced, a new way for measuring the region having a structure unit size those methods are not good at measuring will be found.

Furthermore, as devices having such a microstructure, research and development are being performed with respect not only a semiconductor integrated circuit, but also a discrete track aiming at a high recording density of a magnetic recording medium or the like, patterned media, and the like. The similar technology with X-ray is considered to be applicable even to the evaluation of these devices. What has been described above is the background in which the present inventor has started developing the CD measurement through the use of X-ray.

In response to the request for the CD measurement, through the use of the methods disclosed in patent document 2 and non-patent document 1, it is possible to specify the dimension of a microstructure to some degree. However, for example, in the method disclosed in non-patent document 1, since calculation is performed one-dimensionally, the heights of a structure such as a grating are averaged in the height direction. Therefore, when the density of a side wall portion is gradually changed in the line and space microstructure, it is impossible to determine whether the change is caused by the inclination of the side wall, or the roughness. As described above, there is a limitation in accurately specifying the feature of a microstructure with the conventional method.

The present invention has been made in view of the above situation, and an object of the present invention is to provide a surface microstructure measurement method, a surface microstructure measurement data analysis method and an X-ray scattering measurement device which can accurately measure a microstructure on a surface and which can evaluate a three-dimensional structural feature.

(1) To achieve the above object, according to the present invention, there is provided a surface microstructure measurement method of measuring a microstructure on a specimen surface, the method including the steps of: irradiating the specimen surface with X-ray at a grazing incident angle and measuring a scattering intensity assuming a specimen model with a microstructure on a surface in which one or more layers is formed in a direction perpendicular to the surface and unit structures are periodically arranged in a direction parallel to the surface within the layers, calculating a scattering intensity of the X-ray scattered by the microstructure, and fitting the scattering intensity of the X-ray calculated by the specimen model to the measured scattering intensity; and determining, as a result of the fitting, an optimum value of a parameter for specifying a shape of the unit structures.

As described above, in the surface microstructure measurement method according to the present invention, since X-ray that is an electromagnetic wave whose wavelength is sufficiently shorter than a target to be measured, is used for measurement, it is possible to more accurately measure a fine structure than in a case where light or the like, whose wavelength is longer than the target to be measured, is used. It is also possible to evaluate the three-dimensional features of the periodically arranged unit structure and to evaluate the surface structure and the like of various devices formed with lines and spaces and dots.

(2) In addition, in the surface microstructure measurement method according to the present invention, the unit structure are formed with a uniform substantial region and a uniform vacant region within the layers, and the scattering intensity of the X-ray caused by the substantial region is calculated. As described above, since features included in the specimen are represented by being divided into the substantial region and the vacant region, specific formulas for the calculation of the X-ray scattering intensity are provided, the fitting for optimizing the shape parameters of the substantial region appearing there is performed, it is possible to easily evaluate the accurate structural feature of the specimen.

(3) Furthermore, in the surface microstructure measurement method according to the present invention, in consideration of effects of refraction and reflection produced by a plurality of multiple layers formed in the specimen model, the scattering intensity of X-ray scattered by the microstructure is calculated. Therefore, since, at this time, the specimen model in which the layer structure is formed is assumed and consideration is given to the effects of refraction and reflection caused by these multiple layers, it is possible to accurately analyze a microstructure formed on the surface.

(4) Moreover, in the surface microstructure measurement method according to the present invention, by assuming that the unit structures have positional fluctuations from an exact periodical position and the positional fluctuations do not depend on differences between mutual positions and are random, the scattering intensity of the X-ray is calculated. Therefore, it is possible to properly evaluate the microstructure of a specimen in which the positional fluctuations of the unit structures do not depend on differences between mutual positions.

(5) In the surface microstructure measurement method according to the present invention, by assuming that the unit structures have positional fluctuations from an exact periodical position, and the positional fluctuations depend only on a relative positional relation between the unit structure, the scattering intensity of the X-ray is calculated. Therefore, it is possible to evaluate the surface microstructure of a specimen in which the unit structures have positional fluctuations from an exact periodical position.

(6) Furthermore, in the surface microstructure measurement method according to the present invention, when the positional fluctuations of the unit structures have periodicity, an amplitude and a period of the positional fluctuations are used to express mean square of the positional fluctuations of the unit structures, and thus the scattering intensity of the X-ray is calculated. Therefore, it is possible to evaluate the surface microstructure of a specimen in which the positional fluctuations of the unit structures have periodicity.

(7) Moreover, in the surface microstructure measurement method according to the present invention, in a specimen model in which the unit structures have the substantial region within a cylinder, the scattering intensity of the X-ray is calculated. Therefore, it is possible to easily measure the surface microstructure of a specimen in which the unit structures have a cylindrical shape.

(8) In addition, in the surface microstructure measurement method according to the present invention, in a specimen model in which the unit structures have the substantial region within trapezoid that is uniform in an x direction parallel to the specimen surface, the scattering intensity of the X-ray is calculated. Therefore, it is possible to easily measure the surface microstructure of a specimen in which the unit structures such as lines and spaces have a trapezoidal cross-sectional shape that is uniform in a certain direction.

(9) Furthermore, in the surface microstructure measurement method according to the present invention, in a specimen model in which the unit structures have the substantial region that is uniform in an x direction parallel to the specimen surface and are divided into elements in a y direction perpendicular to the x direction parallel to the specimen surface, an integral is approximated by a sum of the elements, and thus the scattering intensity of the X-ray is calculated. Therefore, it is possible to evaluate even detailed features of the surface microstructure of a specimen in which the unit structure has a shape that is uniform in a given direction. (10) Moreover, in the surface microstructure measurement method according to the present invention, a specimen model in which the unit structures have a substantial region having a cross-sectional structure that is uniform in the x direction is assumed, either a radius of curvature of a convex end portion of both ends of an upper side or a radius of curvature of a concave base portion of both ends of a lower side of the cross-sectional shape is included in a parameter, and thus the scattering intensity of the X-ray is calculated. Therefore, it is possible to evaluate even detailed features, such as the radius of curvature of an end portion, of the surface microstructure of a specimen in which the unit structure has a uniform trapezoidal cross-sectional shape in a given direction.

(11) Furthermore, in the surface microstructure measurement method according to the present invention, by a specimen model in which the unit structures have a first substantial region formed in a shape of trapezoid that is uniform in the x direction and have one or more second substantial regions whose element of material is different from a element of material of the first substantial region and which are formed in layers on the first substantial region, the scattering intensity of the X-ray is calculated. Through the use of the specimen model described above, it is possible to perform a nondestructive measurement on, for example, whether, in the manufacturing process of various devices, the second substantial region is uniformly formed as a film on a side wall or a bottom portion.

(12) In addition, in the surface microstructure measurement method according to the present invention, by a specimen model in which the unit structures have the substantial region which is uniform in the x direction and in which a cross-sectional shape perpendicular to the x direction is asymmetrically trapezoidal, the scattering intensity of the X-ray is calculated. Through the use of the specimen model described above, even if, in the manufacturing process of various devices, an asymmetrical side wall structure is formed, it is possible to have satisfactory detection sensitivity on the asymmetry of a side wall angle. Consequently, it is possible to effectively utilize the specimen model as the monitor of a process in which asymmetry is a concern.

(13) Furthermore, in the surface microstructure measurement method according to the present invention, by a specimen model in which the unit structures have a substantial region having a periodic structure in each of an x direction parallel to the specimen surface, and a y direction parallel to the specimen surface and perpendicular to the x direction, and which are divided into elements in the x and y directions parallel to the specimen surface, the scattering intensity of the X-ray of each of the elements is integrated by a sum of the elements. Therefore, it is possible to evaluate the difference of a cross-sectional shape even when a two-dimensional periodic structure is present on the surface and each of the unit structures has a complicated cross-sectional shape.

(14) Moreover, according to the present invention, there is provided a surface microstructure measurement data analysis method of measuring a microstructure on a specimen surface, the method causing a computer to execute the steps of: assuming a specimen model with a microstructure on a surface in which one or more layers is formed in a direction perpendicular to the surface and unit structures are periodically arranged in a direction parallel to the surface within the layers, calculating a scattering intensity of X-ray scattered by the microstructure in consideration of effects of refraction and reflection produced by the layers, and fitting the scattering intensity of X-ray calculated by the specimen model to a scattering intensity that is actually measured by irradiating the specimen surface with X-ray at a grazing incident angle; and determining, as a result of the fitting, an optimum value of a parameter for specifying a shape of the unit structures.

Therefore, an advantage produced by using the X-ray whose wavelength is short is utilized, and it is possible to accurately measure a microstructure as compared with a case where light scattering or the like is used. Moreover, through the use of the specimen model in which a layer structure is formed and the scattering intensity corresponding to the shape of the substantial region on the surface, it is possible to evaluate the three-dimensional structural feature of the specimen and to evaluate the surface structure and the like of various devices formed by lines and spaces and dots.

(15) Furthermore, according to the present invention, there is provided an X-ray scattering measurement device suitable for measuring a microstructure on a specimen surface, the X-ray scattering measurement device including: a monochromater that spectrally reflects X-ray emitted form an X-ray source; a slit portion capable of limiting a spot size of the spectrally reflected X-ray on the specimen surface to 30 µm or less; a specimen stage that allows rotation for changing both an incident angle of the spectrally reflected X-ray on the specimen surface and rotation within a plane of the specimen surface, and that supports the specimen; and a two-dimensional detector that measures the scattering intensity of the X-ray scattered on the specimen surface. Since, in this way, it is possible to suppress the spread of the irradiation region of the X-ray on the specimen surface and to measure the scattering intensity of the X-ray reflecting a nanometer sized microstructure formed on the surface, the accurate measurement of the microstructure is possible.

According to the present invention, it is possible to accurately measure a microstructure as compared with a case where light scattering or the like is used. With the specimen model in which a layer structure is formed and the scattering intensity corresponding to the shape of the substantial region on the surface, it is possible to evaluate the three-dimensional structural feature of the specimen and to evaluate the surface structure and the like of various devices formed by lines and spaces and dots.

BEST MODES FOR CARRYING OUT THE INVENTION

Figure 1:
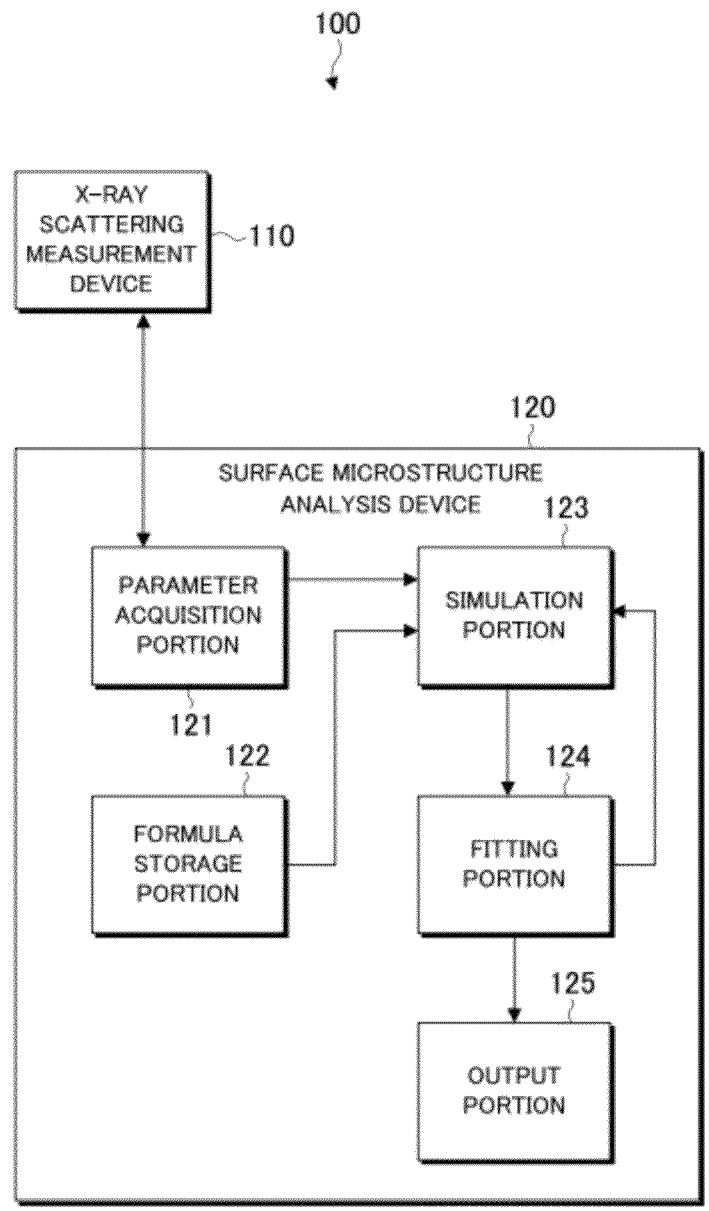
FIG. 1 A diagram showing the configuration and the functional blocks of a surface microstructure measurement system according to the present invention.

An embodiment of the present invention will now be described with reference to accompanying drawings. For ease of understanding description, in drawings, the same constituent components are identified with common reference numerals, and their description will not be repeated.

[Configuration of an Entire System]

FIG. 1 is a diagram showing the configuration and the functional blocks of a surface microstructure measurement system 100. As shown in FIG. 1, the surface microstructure measurement system 100 is formed with an X-ray scattering measurement device 110 and a surface microstructure analysis device 120.

The X-ray scattering measurement device 110 is a device which irradiates a specimen with X-ray at a small angle and which can measure a scattering intensity. The surface microstructure analysis device 120 is a device which uses a known parameter to calculate a scattering intensity and which can calculate the feature of a surface microstructure of the specimen by performing fitting on an actual measured value. The surface microstructure analysis device 120 is a computer that includes, just like a PC or the like, a CPU, a storage device, an input device and an output device, and the input device and the output device may be provided externally. The input device is, for example, a keyboard or a mouse, and is used when a known parameter or the like is input. The output device is, for example, a display or a printer, and outputs the result of fitting.

The surface microstructure analysis device 120 is connected to the X-ray scattering measurement device 110, and stores measurement data that is automatically transmitted from the X-ray scattering measurement device 110. Preferably, the data is automatically transmitted, but the data may be stored in a recording medium or the like in the surface microstructure analysis device 120. Alternatively, a control program is previously installed, and thus it is possible to operate the X-ray scattering measurement device 110 through surface microstructure analysis device 120 at the time of actual measurement.

[Structure of the Analysis Device]

The surface microstructure analysis device 120 includes a parameter acquisition portion 121, a formula storage portion 122, a simulation portion 123, a fitting portion 124 and an output portion 125. The parameter acquisition portion 121 acquires parameters for specifying conditions of X-ray scattering obtained from the X-ray scattering measurement device 110 and parameters input by a user. The acquired parameters include, for example, an incident angle $\alpha$ on the specimen 140 of the X-ray and an initial value of a parameter for specifying the shape of a unit structure on the surface of the specimen. Parameters that are obtained by the fitting include, for example, the height H of the specimen whose cross-sectional view is trapezoidal, the length Wt of the upper side, the length Wb of the lower side, the radius of curvature Rt of a convex end portion of the upper side and the radius of curvature Rb of a convex broad base portion (lower portion edge).

The formula storage portion 122 stores a formula for calculating a scattering intensity on a specific specimen model by simulation. On one hand, the simulation portion 123 acquires, from the formula storage portion 122, a formula for calculating scattering on the desired specimen model from the formula storage portion 122, and on the other hand, the simulation portion 123 selects various necessary parameter values from known parameters acquired from the known parameters, and calculates an X-ray scattering intensity. The fitting portion 124 performs fitting on the X-ray scattering intensity calculated from the simulation portion 123 and the X-ray scattering intensity actually measured by the X-ray scattering measurement device 110.

When each formula is used to calculate the X-ray scattering intensity, known numbers such as an incident angle α, the refractive index of the m-th layer and a polarization factor P are needed. For example, the incident angle α is obtained by automatic transmission through the X-ray scattering measurement device 110, the refractive index $n_m$ of the m-th layer and the polarization factor P are obtained by manual input and a classical electron radius $r_c$ is obtained by utilizing information previously stored. In order to do this, the surface microstructure analysis device 120 needs an input unit, a storage unit and the like, and, based on values obtained from these various units, the simulation portion 123 calculates the scattering intensity. The calculation of the X-ray scattering intensity and the operation of the surface microstructure analysis device 120 at the time of fitting will be described later. The refractive index $n_m$ that matches the structure model may be determined from the measured X-ray scattering intensity.

[Configuration of the Measurement Device]

Figure 2:
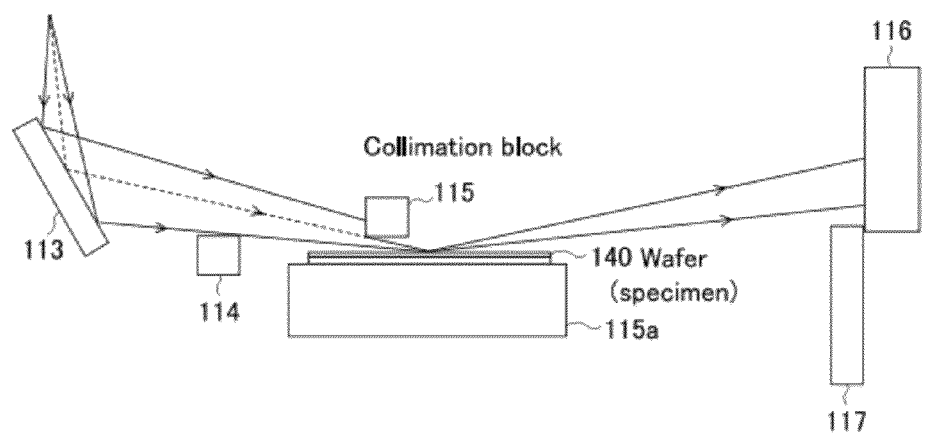
FIG. 2 A side view showing part of an example of the configuration of an X-ray scattering measurement device according to the present invention.
Figure 3:
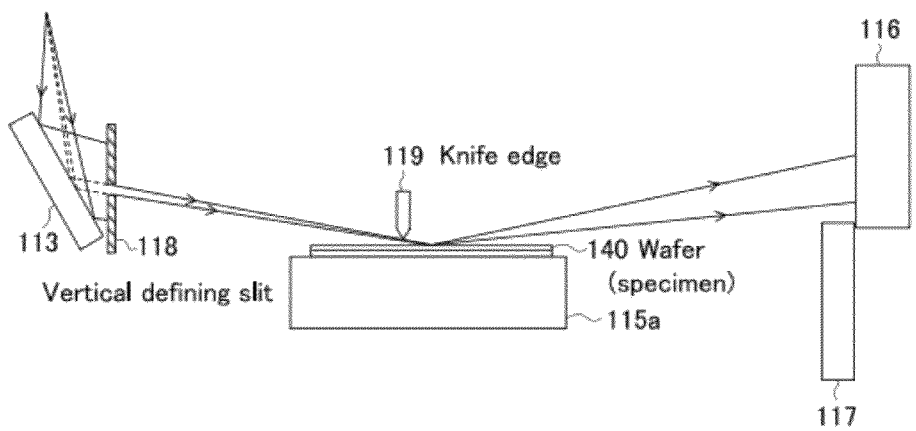
FIG. 3 A side view showing part of an example of the configuration of the X-ray scattering measurement device according to the present invention.

FIGS. 2 and 3 are side views showing part of an example of the configuration of the X-ray scattering measurement device 110. In the configuration shown in FIG. 2, the X-ray scattering measurement device 110 includes a monochromater 113, a first collimation block 114, a second collimation block 115, a specimen stage 115a, a two-dimensional detector 116 and a beam stop 117.

The monochromater 113 spectrally reflects X-ray emitted from an unillustrated X-ray source, and irradiates the specimen 140 with the spectrally reflected X-ray. The first collimation block 114 and the second collimation block 115 are formed with a member that can interrupt the X-ray, and form a slit portion that narrows the spectrally reflected X-ray. With this configuration, an angle at which the specimen 140 is irradiated with the X-ray is narrowed down to a range of 0.1° or more and 0.5° or less. With the pair of collimation blocks 114 and 115, it is possible to limit the spot size of the X-ray on the specimen surface to 30 μm or less. Since, in this way, it is possible to suppress the spread of the irradiation region of X-ray on the specimen surface and to measure the scattering intensity of X-ray reflecting a nanometer sized microstructure formed on the surface, the accurate measurement of the microstructure is possible. It should be noted that the configuration which can limit the spot size to 20 μm or less is more preferable. As described above, by reducing the spot size and the incident angle, it is possible to measure a nanometer sized microstructure on the specimen surface. In particular, by utilizing the collimation blocks 114 and 115, it is possible to accurately interrupt X-ray and increase the accuracy of the collimation.

The specimen stage 115a supports the specimen 140 on a flat stage. The specimen stage 115a can rotate to change the incident angle of the spectrally reflected X-ray on the specimen surface and rotate within the plane of the specimen surface. As described above, the specimen 140 can be rotated, and thus it is possible to measure the scattering intensity through the specimen 140 according to the diffraction angle.

The specimen 140 is a member that has a microstructure on the surface; for example, the specimen 140 is a substrate that is formed of silicon or the like and that has a surface microstructure. The two-dimensional detector 116 measures, on the detection surface, the scattering intensity of the X-ray scattered on the specimen surface. The beam stop 117 receives the incident X-ray that has passed through the specimen 140. As described above, the X-ray scattering measurement device 110 has a structure suitable for the measurement of the microstructure on the specimen surface.

In the configuration shown in FIG. 3, the X-ray scattering measurement device 110 includes a slit 118 and a knife edge 119 instead of the pair of collimation blocks 114 and 115 in the configuration shown in FIG. 2. As described above, with the slit 118 and the knife edge 119, it is possible to easily adjust the spot size of the X-ray.

[Specimens]

Figure 4:
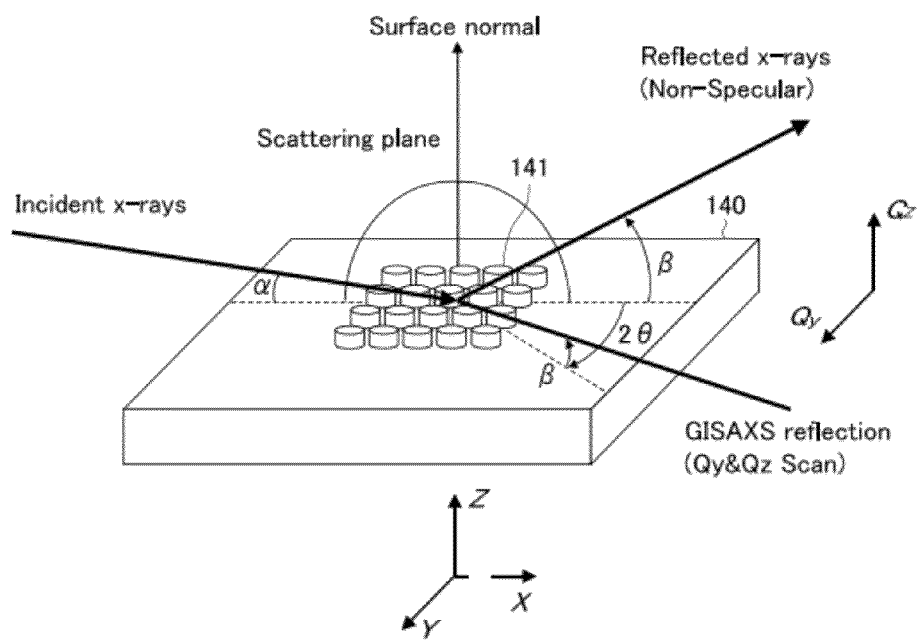
FIG. 4 A perspective view (or a supplement diagram illustrating a formula for simulation) schematically showing an example of a specimen having a surface microstructure.
Figure 5:
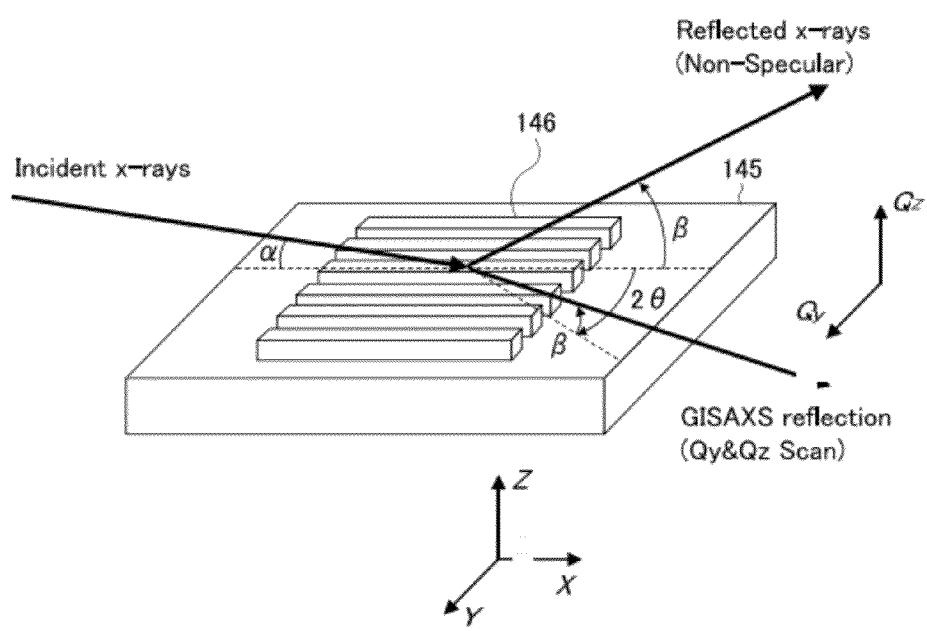
FIG. 5 A perspective view (or a supplement diagram illustrating a formula for simulation) schematically showing an example of a specimen having a surface microstructure.

Here, FIGS. 4 and 5 are referenced as perspective views schematically showing examples of the specimen 140 and a specimen 145 having a surface microstructure. The specimens 140 and 145 have minute periodic structure units of about a few nanometers to a few hundred nanometers on their surfaces. These specimens are irradiated with X-ray, the scattered X-rays are measured and analyzed, and thus it is possible to measure parameters that characterize periodically arranged unit structures.

The specimen 140 shown in FIG. 4 is formed in the shape of a substrate; a microstructure in which, on the surface 141, cylindrical unit structures are periodically arranged in the x direction and the y direction of the figure is formed. Likewise, the specimen 145 shown in FIG. 5 is formed in the shape of a substrate; on the surface 146, unit structures which uniformly extend in the x direction and whose cross-section with respect to a y-z plane is rectangular are periodically arranged in the y direction.

For these specimens 140 and 145, the X-ray whose spot size is narrowed to 50 μm or less and preferably 30 μm or less is incident on the surface 141 of the surface 141 at the incident angle α, fitting is performed on the intensity of the actually measured scattered X ray and the intensity of a scattered X ray calculated through the use of a specimen model of the same shape, and thus it is possible to obtain an actual specimen size. When an experiment of X-ray irradiation is actually performed, the specimens 140 and 145 are arranged such that the direction of the periodic structure agrees with the direction of the incident X-ray. In the figures, the X direction is a direction in which the specimen surface when the specimen is arranged and the incident surface of the X-ray intersect each other, the z direction is a direction perpendicular to the specimen surface and the y direction is a direction perpendicular both to the x direction and the Z direction.

[Measurement Method]

The surface microstructure measurement method of measuring the microstructure on the specimen surface with the surface microstructure measurement system 100 configured as described above will now be described. The predetermined specimen is first set on the specimen stage so as to agree with the direction of the microstructure of the specimen, the specimen surface is irradiated with X-ray at a grazing incident angle, and thus the X-ray scattering intensity is measured. The X-ray intensity is measured according to an X-ray exit angle β. Here, in order for the diffraction of the X-ray due to the periodic structure to be utilized, the specimen is measured while the specimen is being rotated on the z axis within the plane as necessary.

Then, the specimen model is assumed through the use of parameters that specify the shape of the unit structure having the periodic structure of the predetermined specimen, and the X-ray scattering intensity is calculated by simulation. Specifically, one or more layers are formed in the direction perpendicular to the surface in the microstructure on the surface, the specimen model in which the unit structure is periodically arranged in the direction parallel to the surface within the layers is assumed, the scattering of the X-ray refracted and reflected by their interfaces that is caused by the structures is calculated and, based on this, fitting is performed on the X-ray scattering intensity calculated from the specimen model and the measured scattering intensity. As a result of the fitting, the optimum values of the parameters that specify the shape of the unit structure are determined. Its detailed description will be given below.

[Formulas for Simulation]

Formulas for simulation for each specimen model will be described. For the specimen model that has the layer structure on the surface and that has the microstructure where the unit structures are periodically arranged within the layers, the X-ray scattering intensity can be calculated through the use of formula (1) below. Here, FIGS. 4 and 5 are referenced as supplement diagrams to help understand formulas below.

[Formula 1]

$$I(\alpha, \beta, Q_{//}) = (r_c P)^2 N \left\{ \langle |F^{DWBA}|^2 \rangle + \right. \tag{1}$$
$$\left. |\langle F^{DWBA} \rangle|^2 \sum_{|k| \geq 1} \langle e^{-iQ_{//} \cdot (u(X_j) - u(X_k))} \rangle_j e^{-iQ_{//} \cdot (\overline{X}_j - \overline{X}_{j+k})} \right\}$$

$\langle F^{DWBA} \rangle$: the average value of $F^{DWBA}$ with respect to variations between the structure units $j$ $\langle |F^{DWBA}|^2 \rangle$: the average value of $|F^{DWBA}|^2$ with respect to variations between the structure units $j$ $$F_{mj}(Q_Z^a, Q_{//}) \equiv \int_S \frac{e^{-iQ_Z^a Z_{mj}(x_j, y_j)} - 1}{-iQ_Z^a} e^{-i(Q_x \cdot x_j + Q_y \cdot y_j)} dx_j dy_j$$

$Q_{//} = (Q_x, Q_y)$ $Q_{zm}^a = \{Q_{zm}^{TT}, Q_{zm}^{RT}, Q_{zm}^{TR}, Q_{zm}^{RR}\}$ $Q_{zm}^{TT} = k_0(\eta_m + \zeta_m)$ $Q_{zm}^{RT} = k_0(-\eta_m + \zeta_m)$ $Q_{zm}^{TR} = k_0(\eta_m - \zeta_m)$ $Q_{zm}^{RR} = k_0(-\eta_m - \zeta_m)$ $\eta_m = \sqrt{n_m - \cos^2 \alpha}$ $\zeta_m = \sqrt{n_m - \cos^2 \beta}$ α: an incident angle
β: an exit angle
$n_m$: the refractive index of the m-th layer
$Q_{||}$: a component vector parallel to the surface of a scattering vector
$r_c$: a classical electron radius
P: a polarization factor
N: the total number of unit structure
$F_j$: a structure factor of unit structure
$\overline{X}_j$: an ideal periodical position of unit structure
$u(X_j)$: a displacement of the position of unit structure j due to local disturbance
x: ad direction in which the incident plane and the specimen surface
     intersect each other
y: a direction perpendicular to the x direction and the z direction
z: a direction perpendicular to the specimen surface
$F^{DWBA}$ is based on formula (37), which will be described later.

In formula (I), it is assumed that the unit structure is formed by a substantial region and a vacant region which are uniform within the layers and that the substantial region causes scattering, and Zmj (xj, yj) indicates the boundary between the substantial region and the vacant region. As described above, by using the scattering intensity formula corresponding to the specimen model in which the layer structure is formed and the shape of the substantial region on the surface, it is possible to evaluate the three-dimensional structural feature of the specimen and to evaluate the surface structure and the like of various devices formed by lines and spaces and dots.

Although, in formula (1), consideration is given to the positional fluctuations $u(X_j)$ of the unit structure from the exact periodical position, it is impossible to perform specific calculation on $u(X_j)$ as it is. If it can be assumed that the positional fluctuations of the unit structure do not depend on Xj and is random, formula (2) below can be used.

[Formula 2]

$$I(\alpha, \beta, Q_{//}) = \tag{2}$$
$$(r_c P)^2 N \left\{ \langle |F^{DWBA}|^2 \rangle + |\langle F^{DWBA} \rangle|^2 e^{-\frac{Q_u^2 \Delta \overline{u}^2}{2}} \sum_{|k| \geq 1} e^{-iQ_{//} \cdot (\overline{X}_j - \overline{X}_{j+k})} \right\}$$

$Q_u$: the projection of the scattering vector in the u direction
$\Delta \overline{u}$: the average of the positional fluctuations In formula (2), it is assumed that the effects of the positional fluctuations on the scattering do not depend on the relative positional relation between the unit structures. Therefore, it is possible to evaluate the surface microstructure of the specimen in which the unit structures have random positional fluctuations.

In contrast, if a specimen model having periodicity of the positional fluctuations of the unit structure can be assumed, formula (3) below can be used.

[Formula 3]

$$I(\alpha, \beta, Q_{//}) = (r_c P)^2 N \left\{ \langle |F^{DWBA}|^2 \rangle + \right. \tag{3}$$
$$\left. |\langle F^{DWBA} \rangle|^2 \sum_{|k| \geq 1} e^{-iQ_{//} \cdot (\overline{X}_j - \overline{X}_{j+k})} e^{-\frac{Q_u^2}{2} a^2 \left(1 - \cos\left(2\pi \frac{|\Delta X_k|}{P}\right)\right)^2} \right\}$$

$Q_u$: the projection of the scattering vector in the u direction
b: the amplitude of the positional fluctuations
p: the period of the positional fluctuations
$\Delta X_k$: a distance between the unit structures As described above, if the positional fluctuations of the unit structure have periodicity, it is possible to calculate the X-ray scattering intensity through the use of the amplitude and the period of the positional fluctuations, and to evaluate the surface microstructure of the specimen.

Although, in order to integrate the structure factor $F_j$ of the unit structure, it is necessary to determine an integral by inserting a parameter according to the shape of the unit structure of the specimen model, in a specific case, it is possible to determine an integral by a simple formula. The structure factor used in accordance with the shape of the unit structure will be described below.

(Cylindrical Shape)

When a specimen model in which the unit structure has a cylindrical shape can be assumed, the structure factor $F_j$ of the unit structure indicated by formula (4) below can be used. In formula (4), a specimen model in which the unit structure has a substantial region within the cylinder is assumed.

[Formula 4]

$$F_j(Q_z^a, Q_{//}) = 2\pi A \frac{e^{-iQ_z^a}-1}{-iQ_z^a} \frac{J_1(A \cdot |Q_{//}|)}{|Q_{//}|} \quad (4)$$

A: the radius of the cylindrical shape of the unit structure
H: the height of the cylindrical shape of the unit structure
$J_1$: a vessel function (Shape Whose Cross Section is Trapezoidal)

When a specimen model in which the unit structure has a shape whose cross section is uniformly trapezoidal in the x direction can be assumed, the structure factor $F_j$ of the unit structure indicated by formula (5) below can be used. In formula (5), a specimen model in which the unit structure has a substantial region within the trapezoid that is uniform in the x direction parallel to the specimen surface is assumed.

[Formula 5]

$$F_j(Q_z^a, Q_{//}) = 2\pi\delta(Q_x)\frac{1}{iQ_y}\left[e^{-i\frac{W_b}{2}Q_y}\frac{e^{-i\left(Q_z^a-\frac{W_b-W_t}{2H}Q_y\right)H}-1}{-i\left(Q_z^a-\frac{W_b-W_t}{2H}Q_y\right)} - \right.$$
$$\left. e^{i\frac{W_b}{2}Q_y}\frac{e^{-i\left(Q_z^a+\frac{W_b-W_t}{2H}Q_y\right)H}-1}{-i\left(Q_z^a+\frac{W_b-W_t}{2H}Q_y\right)}\right] \quad (5)$$

$\delta_{(x)}$: a δ function
$Q_x$: an x direction component of a scattering vector
$Q_y$: a y direction component of the scattering vector
$W_t$: the length of an upper side of a trapezoidal cross section of the unit structure
$W_b$: the length of a lower side of the trapezoidal cross section of the unit structure
H: the length of the trapezoidal cross section of the unit structure (Other Complicated Shapes)

If, when a shape that is uniform in the x direction is a target, the simple-shape specimen model described above is used, it is possible to determine $F_j$ mathematically. However, for example, when the specimen model of a complicated shape needs to be assumed such as when, in a shape whose cross section is trapezoidal, consideration needs to be given to the radius of curvature of an end portion, a specimen model in which the unit structure has a uniform shape in the x direction and element division is performed in the y direction is assumed, and thus it is possible to perform fitting through the use of the structure factor $F_j$ of the unit structure indicated by formula (6) below. With such a formula, it is possible to obtain parameters such as the height of a trapezoidal cross section, an upper side, a lower side, the radius of curvature of both ends of the upper side and the radius of curvature of the base portion of both ends of the lower side. As described above, in formula (6), the specimen model in which the unit structure has a uniform substantial region in the x direction parallel to the specimen surface and in which the element division is performed in the y direction parallel to the specimen surface and perpendicular to the x direction. The sum of the elements is used to approximate an integral.

[Formula 6]

$$F_j(Q_z^a, Q_x, Q_y) = 2\pi\delta(Q_x) \cdot \Delta y \sum_{s=-\frac{n-1}{2}}^{s=\frac{n-1}{2}} \frac{e^{-iQ_z^a Z(\Delta y \cdot s)}-1}{-iQ_z^a} e^{-2\pi i \frac{h \cdot s}{n}} \quad (6)$$

$$\Delta y = \frac{L}{n}$$

$$\Delta Q_y = \frac{2\pi}{L}$$

δ(x): a δ function
$Q_x$: an x direction component of a scattering vector
$Q_y$: a y direction component of the scattering vector
L: the length of the unit structure in the y direction
n: the number of divided elements of the unit structure ◻◻◻ in the y direction
h: the order of diffraction when L is a surface space In formula (6), with respect to the y-z cross section of the unit structure, the height, the length of an upper side, the length of a lower side, the radius of curvature of a convex end portion of both ends of the upper side and the radius of curvature of the concave base portion of both ends of the lower side can be used as parameters that characterize the unit structure. As described above, with formula (6), it is possible to evaluate even the detailed features.

[Calculation Method (Simulation and Fitting)]

Figure 6:
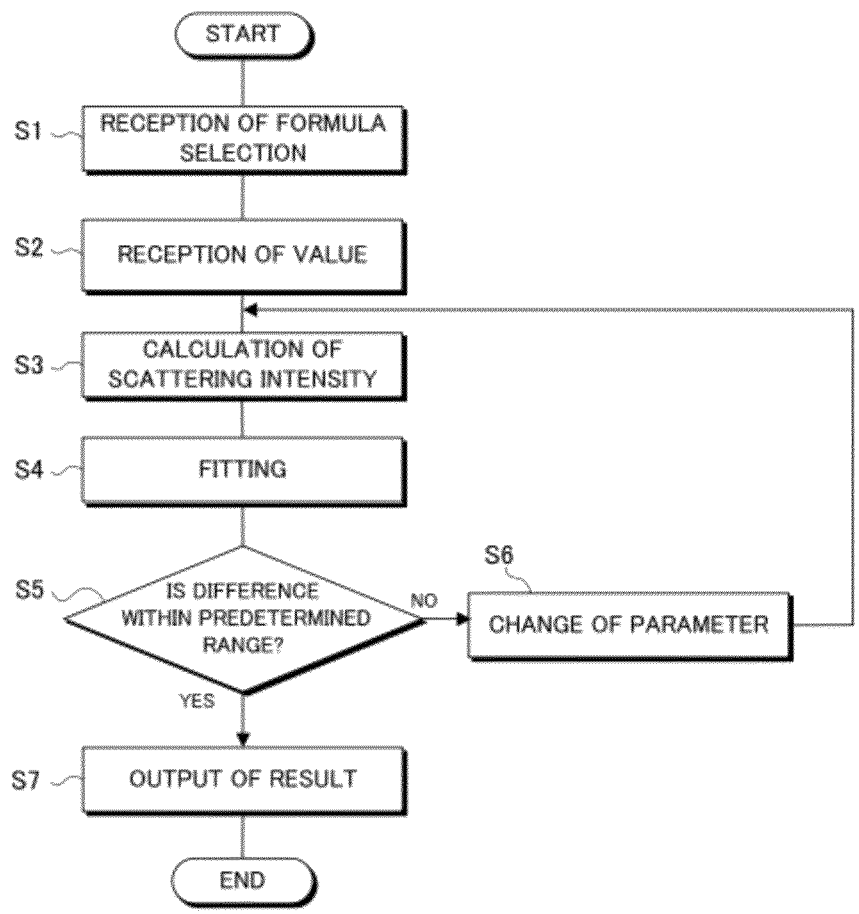
FIG. 6 A flowchart showing the operation of a simulation and fitting in a surface microstructure measurement device.

Next, simulation and fitting will now be described as the method of determining the X-ray scattering intensity through the use of parameters that specify the unit structures having a periodic structure formed within the layers of the specimen. FIG. 6 is a flowchart showing the operation of simulation and fitting in the surface microstructure analysis device 120. A previously and actually measured X-ray scattering intensity is set to be automatically transmitted from the X-ray scattering measurement device 110 and be stored in the surface microstructure analysis device 120.

A specimen model is first assumed according to the actually measured specimen, and a formula corresponding to the specimen model having a periodic structure on the surface is selected from formulas (1) to (3) and (4) to (6). The conditions are set at the same conditions as in the actual measurement, and a formula of an appropriate specimen model is selected. The surface microstructure analysis device 120 receives an input on the selection of a formula from the user (step S1). In the scattering intensity given by the selected formula, a shape factor Fj is an important element.

The X-ray that enters the specimen and propagates through a plurality of layers is refracted and reflected not only on the specimen surface but also on the interface between the layers (including the interface between the substrate and the film). As the number of layers is increased, their influences are increased. Therefore, through the use of a formula in which consideration is given to the refraction and the reflection on the interface, it is possible to enhance the accuracy of analysis on the specimen having a complicated surface structure.

Next, values necessary for calculation using the formula are received through input by the user and through automatic transmission by the X-ray scattering measurement device 110 (step S2). As initial fitting parameters, for example, there are values of the diameter a of a circular cylinder, the height H, the upper side of a trapezoid Wt, the length of the lower side Wb, the height H, the radius of curvature of a convex end portion of the upper side Rt and the radius of curvature of a concave portion of the base portion. Furthermore, the entire intensity is determined by the total number of structures N. As described later, by optimizing the values of individual parameters [a, H and N] or [Wt, Wb, H, Rt, Rb and N], it is possible to calculate a scattering intensity that fits the actually measured scattering intensity.

Then, through the use of the formula selected as described above and the received values, the scattering intensity is calculated (step S3). The formula is calculated through the use of the above parameters, and thus the scattering intensity with respect to Qy and Qz on the detection surface is obtained.

Then, the fitting is performed on the calculated X-ray scattering intensity and the actually measured X-ray scattering intensity (step S4). Each of the X-ray scattering intensity is represented as a curve on the detection surface. In this fitting, the agreement (or a difference between both curves) of the curve resulting from the experiment with the calculated curve is examined. For example, the difference W between both curves is obtained by the following formula.

[Formula 7]
$$W^2 = \sum_i (\log I_i(\exp) - \log I_i(\mathrm{cal}))^2$$

$I_i(\exp)$: an X-ray scattering intensity that is actually measured at an i-th measurement point
$I_i(\mathrm{cal})$: an X-ray scattering intensity that is calculated at the i-th measurement point Then, if the difference W falls within a predetermined range, it is determined that both curves agree with each other whereas, if not, it is determined that both curves do not agree with each other (step S5).

If it is determined that both curves do not agree with each other, the fitting parameters that specify the shape of the unit structure are changed (step S6), the X-ray scattering intensity is calculated again and whether or not the agreement with the actually measured X-ray scattering intensity is performed is determined. This process is repeated while the values of the fitting parameters are adjusted and changed until both curves agree with each other.

The selected values of the fitting parameters when the calculated X-ray scattering intensity and the actually measured X-ray scattering intensity agree with each other are values that indicate the shape of the unit structure constituting the surface microstructure of the specimen. The surface microstructure analysis device 120 outputs the results of the obtained fitting parameters (step S7) and finishes. In this fitting, for example, by using a nonlinear least-squares method, it is possible to effectively determine the optimum value of each of the fitting parameters. Although, in the above example of the fitting, the optimum value is calculated while the value of the fitting parameter is being adjusted, any fitting method may be used, and the fitting method is not particularly limited.

The calculation and the fitting of the X-ray scattering intensity in the embodiment described above can be performed by the surface microstructure analysis device 120 through the use of software that can be stored and started up by a computer. The surface microstructure analysis device 120 is preferably configured such that data can be exchanged between the X-ray scattering measurement device 110 and the surface microstructure analysis device 120 either bidirectionally or unidirectionally. Preferably, in the selection of the optimum values of the parameters by the simulation portion 123, in order for the agreement of the calculated X-ray scattering intensity with the actually measured X-ray scattering intensity to be increased (for example, to be brought close to a predetermined value), analysis is completely automatically performed by automatic selection through the use of a least-squares method. The parameters may be freely and automatically input. In each step, the calculation may be continuously and automatically performed or may be performed by the user through the use of a computer.

[Principle and Derivation of Formulas]

(X-Ray Diffraction from a Periodical Arrangement Structure)

The derivation of formulas used in the simulation described above will be described. When the X-ray scattering/diffraction from the aggregation of the unit structure is first considered, a basic formula for the scattering is as follows.

[Formula 8]
$$I(Q) = \left| r_c P \sum_\mu f_\mu(Q) e^{-iQX_\mu} \right|^2 = (r_c P)^2 \sum_{\mu,\nu} f_\mu(Q) f_\nu^*(Q) e^{-iQ \cdot (X_\mu - X_\nu)} \quad (7)$$

$f_\mu$: a scattering factor of a μ Atom
$X_\mu$: the position of the μAtom
Q: a scattering vector
P: a polarization factor
$r_c$: a classical electron radius ($=2.818\times10^{-15}$ m)

In the case of small angle scattering, even if it is assumed that atoms constituting the unit structure are not discretely present but are continuously present, excellent approximation is obtained. Therefore, an internal coordinate $r_u$ is introduced, and the atom position is changed to $X_\mu \to X_j + r_u$. Here, $X_j$ is a position coordinate that is typical of the unit structure j. In this way, formula (7) is rewritten as follows.

[Formula 9]
$$I(Q) = \left| r_c P \sum_j e^{-iQX_j} \int_v \rho_j(r_j) e^{-iQ \cdot r_j} dv_j \right|^2 \quad (8)$$
$$= \left| r_c P \sum_j F_j(Q) e^{-iQ \cdot X_j} \right|^2 = (r_C P)^2 \sum_{j,k} F_j(Q) F_k^*(Q) e^{-iQ \cdot (X_j - X_k)}$$

Here, by assuming that the atoms within the unit structure are continuously distributed, its structure factor is expressed as the following integration.

[Formula 10]
$$F_j(Q) \equiv \int_v \rho_j(r_j) e^{-iQ \cdot r_j} dv_j \quad (9)$$

Then, if it is assumed that the atoms within the unit structure are uniformly distributed, formula (9) is further simply expressed as the following formula.

[Formula 11]
$$F_j(Q) = \int_v e^{-iQ \cdot r_j} dv_j \quad (10)$$

Since, as described above, the function indicating the shape of the unit structure is derived, this function is also referred to as a form factor or a shape factor.

Then, in order for the scattering intensity when the unit structures are periodically arranged to be determined, the sum of formula (8) is calculated in consideration of the periodic structure and its "displacement." The displacement of the periodic structure in crystal is formulated with respect to fluctuations in atom position due to thermal vibrations, static displacement from the crystal lattice position of the atom due to crystal defects and the like. This method is applied to the displacement from the periodical arrangement of the unit structures. Therefore, the position vector $X_j$ of the unit structure is divided into an exact periodical position and displacement therefrom.

[Formula 12]

$$I(Q) = (r_c P)^2 \sum_{j,k} F_j(Q) F_k^*(Q) e^{-iQ \cdot (u(X_j) - u(X_k))} e^{-iQ \cdot (\overline{X}_j - \overline{X}_k)} \quad (11)$$

$\overline{X}_j$: a periodical position
$u(X_j)$: disturbance from the periodical position Furthermore, in order for the scattering intensity to be calculated in consideration of fluctuations in the position of each of the unit structures and fluctuations in the size, statistical processing is introduced.

[Formula 13]

$$I(Q) = (r_c P)^2 \left\{ \sum_j |F_j(Q)|^2 + \sum_{j \neq k} F_j(Q) F_k^*(Q) e^{-iQ \cdot (u(X_j) - u(X_k))} e^{-iQ \cdot (\overline{X}_j - \overline{X}_k)} \right\} \quad (12)$$

$$(r_c P)^2 N \left\{ \langle |F_j(Q)|^2 \rangle_j + \sum_{|k| \geq 1} \langle F_j(Q) F_{k+j}^*(Q) \rangle_j \langle e^{-iQ \cdot (u(X_j) - u(X_k))} \rangle_j e^{-iQ \cdot (\overline{X}_j - \overline{X}_{k+j})} \right\}$$

The following operator indicates the statistical average of a physical quantity A with respect to the total number of unit structures N.

[Formula 14]

$$\langle A_j \rangle_j \equiv \frac{1}{N} \sum_j A_j \quad (13)$$

Here, because of the uniformity of the entire system, it is assumed that a correlation function depends only on the relative positional relation k of the both.

First, an exponential function is first expanded in consideration of positional fluctuations. For simplicity, the following relation is assumed to hold true.

$|Q \cdot (u(X_j) - u(X_{j+k}))| << 1$ [Formula 15]

Then, the following formula is obtained.

[Formula 16]

$$\langle e^{-iQ \cdot (u(X_j) - u(X_{j+k}))} \rangle_j \approx \quad (14)$$

$$1 + \langle -iQ \cdot (u(X_j) - u(X_{j+k})) \rangle_j + \frac{1}{2} \langle (-iQ \cdot (u(X_j) - u(X_{j+k})))^2 \rangle_j + L$$

Since positive and negative terms are certainly present in the relative positional relation, they are averaged, and thus the first term becomes zero and the second term remains. Therefore, the relative positional relation can be expressed as the following formula in the range of this approximation.

[Formula 17]

$$\langle e^{-iQ \cdot (u(X_j) - u(X_{j+k}))} \rangle_j \approx e^{-\frac{\langle (Q \cdot (u(X_j) - u(X_{j+k})))^2 \rangle_j}{2}} + L \quad (15)$$

$$= e^{-\frac{Q_u^2 \langle \Delta u(\Delta X_k)^2 \rangle}{2}} + L$$

$$= e^{-\frac{Q_u^2 g(\Delta X_k)}{2}} + L$$

However, it is assumed that the correlation of the displacement is expressed as a function $g(\Delta X_k)$ of only the difference $\Delta X_k$ between mutual positions. In addition, $Q_u$ represents the projection of a scattering vector Q in the u direction of the displacement. The correlation of fluctuations in position causes so-called Hung scattering in the X-ray diffraction. As a simple example of the correlation, specific expressions for a case where random displacement occurs regardless of the distance and a case where the position fluctuates periodically are given. Formula (6) can be written as follows through the use of $g(\Delta X_k)$.

[Formula 18]

$$I(Q) = (r_C P)^2 N \left\{ \langle |F_j(Q)|^2 \rangle_j + \sum_{|k| \geq 1} \langle F_j(Q) F_{j+k}^*(Q) \rangle_j e^{-iQ \cdot (\overline{X}_j - \overline{X}_{j+k})} e^{-\frac{Q_u^2 g(\Delta X_k)}{2}} \right\} \quad (16)$$

$g(\Delta Xk)$: a function depending on the relative position

When $g(\Delta X_k)$ is not related to the distance, as shown in formula (16a), it is expressed as constant mean square fluctuations. The mean square fluctuations that are expressed regardless of the distance behave just like a temperature factor in crystal diffraction. If the amplitude of the fluctuations in position having a period p is assumed to be b, it can be expressed as the following formula (16b).

[Formula 19]

$$g_{(\Delta X_k)} = \Delta \overline{u}^2 \quad (16a)$$

$$g_{(\Delta X_k)} = b^2 \left(1 - \cos\left(2\pi \frac{|\Delta X_k|}{p}\right)\right)^2 \quad (16b)$$

Then, a diffraction intensity can be expressed as follows.

[Formula 20]

$$I(Q) = (r_c P)^2 N \left\{ \langle |F_j(Q)|^2 \rangle_j + \sum_{|k|\geq 1} \langle F_j(Q) F_{j+k}^*(Q) \rangle_j e^{-iQ\cdot(\overline{X}_j - \overline{X}_{j+k})} e^{-\frac{Q_u^2}{2} b^2 \left(1 - \cos\left(2\pi \frac{|\Delta X_k|}{p}\right)\right)^2} \right\} \quad (17)$$

With this formula, it is possible to express not only a diffraction peak resulting from an original period but also a peak resulting from a superlattice period p times as high as it.

In general, the structure fluctuation of the unit structure in which the structure factor is expressed as formula (9) or (10) may have a correlation that depends on the difference $\Delta X_k$ between the mutual positions. However, when such a correlation can be ignored, the correlation of the structure factor can be expressed as the following formula.

$$\langle F_j(Q) F_{j+k}^*(Q) \rangle_j = \langle F_j(Q) \rangle_j \langle F_{j+k}^*(Q) \rangle_j = |\langle F(Q) \rangle|^2 \quad \text{[Formula 21]}$$

Then, formulas (12), (16) and (17) can be simply expressed as follows.

[Formula 22]

$$I(Q) = (r_c P)^2 N \left\{ \langle |F(Q)|^2 \rangle + |\langle F(Q) \rangle|^2 \sum_{|k|\geq 1} \langle e^{-iQ\cdot(u(X_j) - u(X_k))} \rangle_j e^{-iQ\cdot(\overline{X}_j - \overline{X}_{j+k})} \right\} \quad (12')$$

$$I(Q) = (r_c P)^2 N \left\{ \langle |F(Q)|^2 \rangle + |\langle F(Q) \rangle|^2 e^{-\frac{Q_u^2 \Delta \pi^2}{2}} \sum_{|k|\geq 1} e^{-iQ\cdot(\overline{X}_j - \overline{X}_{j+k})} \right\} \quad (16')$$

$$I(Q) = (r_c P)^2 N \left\{ \langle |F(Q)|^2 \rangle + |\langle F(Q) \rangle|^2 \sum_{|k|\geq 1} e^{-iQ\cdot(\overline{X}_j - \overline{X}_{j+k})} e^{-\frac{Q_u^2}{2} b^2 \left(1 - \cos\left(2\pi \frac{|\Delta X_k|}{p}\right)\right)^2} \right\} \quad (17')$$

The noted point here is that, since, in the formula of the structure factor of the unit structure, the first term is the square of itself, averaging is performed after the squaring and that, since the subsequent term is a term appearing as a result of interference between different scattering members, averaging is performed on each structure factor, and then squaring is performed. Therefore, when the periodic structure is continuous over a long distance, the second term makes a significant contribution whereas, when regularity is low, the contribution of the two terms is gradually changed according to the magnitude of Q. When these formulas are employed, it is possible to properly describe how the method of averaging the structure factors is changed. However, in general, the coherence region of the X-ray is narrow, and all the observed regions are unlikely to coherently contribute to the scattering. In such a case, in order to give consideration to the distribution of the structure, it is necessary to perform new averaging corresponding to the distribution of each of the above three formulas.

(X-ray Diffraction with Consideration Given to Reflection/Refraction on the Surface or the Thin Film)

The purpose of the present invention is to perform structure analysis on the unit structure on the surface. Therefore, the X-ray is incident on the surface at a grazing angle close to the surface, and the diffraction/scattering is measured. In such a case, it is necessary to perform diffraction intensity calculation with consideration given to the reflection/refraction effects of the X-ray on the surface. The calculation method will be described below.

Figure 7:
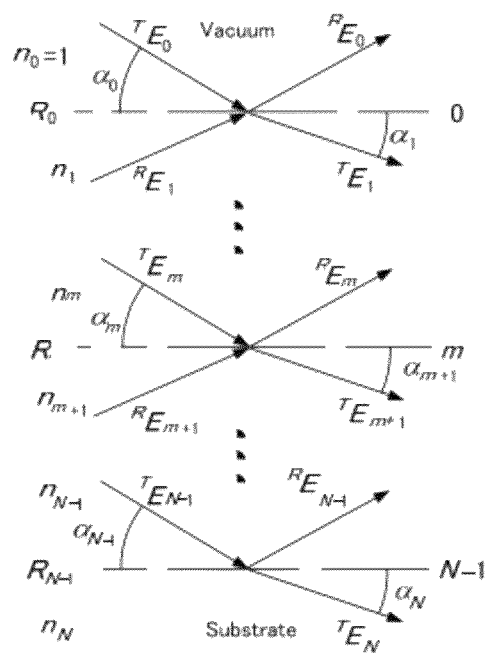
FIG. 7 A schematic diagram showing how an electrical field is changed by an incident X-ray within layers of a specimen having an N-layer structure.
Figure 8:
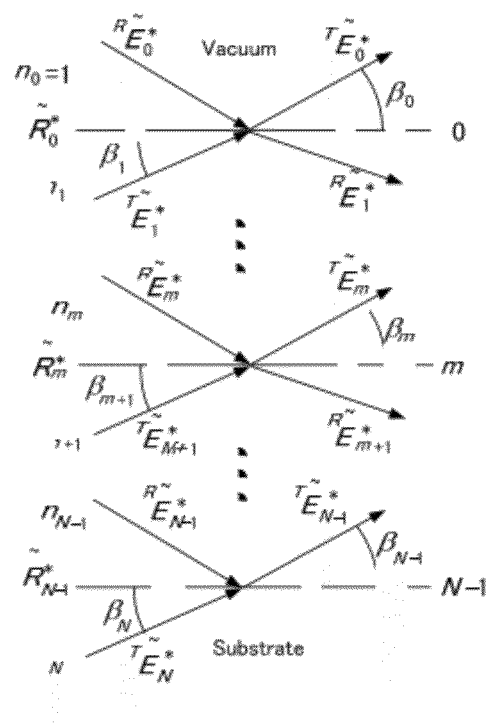
FIG. 8 A schematic diagram showing how the electrical field is changed by the outgoing X-ray within the layers of the specimen having the N-layer structure.

When the X-ray is incident on the specimen surface at a grazing angle, reflection and refraction on the surface and the interface are very important. When reflected X-ray small angle scattering is measured, it is necessary to give consideration to it. FIGS. 7 and 8 are schematic diagrams showing the state of an electric field within the layers of the specimen having a general N-layer multilayer structure. Here, $^T E_m$ and $^R E_m$ represent a propagating wave and a reflection wave, respectively, within m layers. These values can be calculated based on Fresnel formula if the refractive index $n_m$ and the thickness $d_m$ of each layer and the X-ray incident angle $\alpha_0$ are given.

With respect to a scattered wave, it is necessary to consider a wave that is produced within the film and that is emitted from the surface at an exit angle $a_0$. As the solution of a wave equation that represents an electric field within the multilayer film satisfying such conditions, a solution obtained by time-reversing a normal solution can be used. This can be obtained by acquiring the complex conjugate of a normal solution and then changing it such that $t \to -t$ ($k \to -k$). This solution is represented by the following symbols.

$$^T \tilde{E}_m^*, ^R \tilde{E}_m^* \quad \text{[Formula 23]}$$

a reflection wave and a propagating wave in a scattered wave where $$^T \tilde{E}_0^*$$

a wave that is emitted from the surface

The electric field resulting from the incident wave (wave 1) can be specifically written as follows.

[Formula 24]

$$R_N = 0, \ R_{N-1} = \gamma_{N-1}, \ L, \quad (18)$$

$$R_m = \frac{R_{m+1} \varphi_{m+1}^2 + \gamma_m}{R_{m+1} \varphi_{m+1}^2 \gamma_m + 1}, \ R_0 = \frac{R_1 \varphi_1^2 + \gamma_0}{R_1 \varphi_1^2 \gamma_0 + 1}$$

$$\eta_m = \sqrt{n_m - \cos^2 \alpha_0}, \ \gamma_m = \frac{\eta_m - \eta_{m+1}}{\eta_m + \eta_{m+1}}, \ \tau_m = \frac{2\eta_{m+1}}{\eta_m + \eta_{m+1}}, \quad (19)$$

$$\varphi_m = e^{ik_0 \eta_m d_m}, \ t_m = \frac{1 - \gamma_m R_m}{\tau_m}$$

$$^T E_m(z_m) = \prod_{j=0}^{m-1} (t_j \varphi_j) e^{ik_0 \eta_m z_m} = T_m e^{ik_0 \eta_m z_m}, \quad (20)$$

$$^R E_m(z_m) = \prod_{j=0}^{m-1} R_m(t_j \varphi_j) e^{ik_0 \eta_m z_m} = T_m R_m e^{ik_0 \eta_m z_m}$$

The scattered wave (wave 2) is likewise given by the following formula.

[Formula 25]

$$\tilde{R}_N^* = 0, \tilde{R}_{N-1}^* = \tilde{\gamma}_{N-1}^*, L, \tilde{R}_j^* = \frac{\tilde{R}_{m+1}^* \tilde{\varphi}_{m+1}^{*2} + \tilde{\gamma}_m^*}{\tilde{R}_{m+1}^* \tilde{\varphi}_{m+1}^{*2} \tilde{\gamma}_m^* + 1},$$

$$\tilde{R}_0^* = \frac{\tilde{R}_1^* \tilde{\varphi}_1^{*2} + \tilde{\gamma}_0^*}{\tilde{R}_1^* \tilde{\varphi}_1^{*2} \tilde{\gamma}_0^* + 1}$$

(21)

$$\zeta_m^* = \sqrt{n_m - \cos^2\beta_0}, \tilde{\gamma}_m^* = \frac{\zeta_m^* - \zeta_{m+1}^*}{\zeta_m^* + \zeta_{m+1}^*}, \tilde{t}_m^* = \frac{2\zeta_{m+1}^*}{\zeta_m^* + \zeta_{m+1}^*},$$

$$\tilde{\varphi}_m^* = e^{-ik_0\zeta_m^* d_m}, \tilde{t}_m^* = \frac{1 - \tilde{\gamma}_m^* \tilde{R}_m^*}{\tilde{t}_m^*}$$

(22)

$${}^T\tilde{E}_m^*(z_m) = \prod_{j=0}^{m-1}(\tilde{t}_j^*\tilde{\varphi}_j^*)e^{ik_0\zeta_m^* z_m} = \tilde{T}_m^* e^{ik_0\zeta_m^* z_m},$$

$${}^R\tilde{E}_m^*(z_m) = \prod_{j=0}^{m-1} R_m^*(\tilde{t}_j^*\tilde{\varphi}_j^*) e^{ik_0\zeta_m^* z_m} = T_m^* R_m^* e^{-ik_0\zeta_m^* z_m}$$

(23)

These quantities can be calculated if the parameters $n_m$ and $d_m$ of the incident angle, the exit angle and the film structure are given. Instead of the above formula, the following formula can also be used as a formula with consideration given to interface roughness $\sigma_m$.

$$\gamma_m = \frac{\eta_m - \eta_{m+1}}{\eta_m + \eta_{m+1}} \exp[-2k_0^2 \eta_m \eta_{m+1} \sigma_m^2],$$

$$\tilde{\gamma}_m^* = \frac{\zeta_m^* - \zeta_{m+1}^*}{\zeta_m^* + \zeta_{m+1}^*} \exp[-2k_0^2 \zeta_m^* \zeta_{m+1}^* \sigma_m^2]$$

(24)

Through the use of these, a transition amplitude from wave 1 to wave 2 caused by a potential $V_m$ due to nonuniform density within the m layers can be written as follows.

[Formula 27]

$$\psi_j^i(\alpha) = \prod_{j=1}^{l-1}(t_j\varphi_j)e^{-ik_0\eta_m z_m} + \prod_{j=1}^{m-1} R_m(t_j\varphi_j)e^{ik_0\eta_m z_m} =$$

$$T_m e^{-ik_0\eta_m z_m} + T_m R_m e^{ik_0\eta_m z_m}$$

(25)

$$\tilde{\psi}_m^f(\beta) = \prod_{j=1}^{m-1}(\tilde{t}_j^*\tilde{\varphi}_j^*)e^{ik_0\zeta_m^* z_m} + \prod_{j=1}^{m-1} \tilde{R}_m^*(\tilde{t}_j^*\tilde{\varphi}_j^*)e^{-ik_0\zeta_m^* z_m} =$$

$$\tilde{T}_m^* e^{ik_0\zeta_m^* z_m} + \tilde{T}_m^* \tilde{R}_m^* e^{-ik_0\zeta_m^* z_m}$$

(26)

$$\langle \tilde{\psi}^f(\beta)|V|\psi^i(\alpha)\rangle = \sum_m \langle \tilde{\psi}_m^f(\beta)|V_m|\psi_m^i(\alpha)\rangle$$

$$= \sum_m \tilde{T}_m T_m (\langle \zeta_m^*|V_m|\eta_m\rangle + R_m \langle \zeta_m^*|V_m| - \eta_m\rangle +$$

$$\tilde{R}_m \langle -\zeta_m^*|V_m|\eta_m\rangle + \tilde{R}_m R_m \langle -\zeta_m^*|V_m| - \eta_m\rangle)$$

(27)

The square of the absolute value of formula (27) obtained here gives a scattering probability. The processing of the surface scattering described above is referred to as distorted wave born approximation (DWBA).

(Shape (Structure) Factor of a Surface Nano-Structure)

Figure 9:
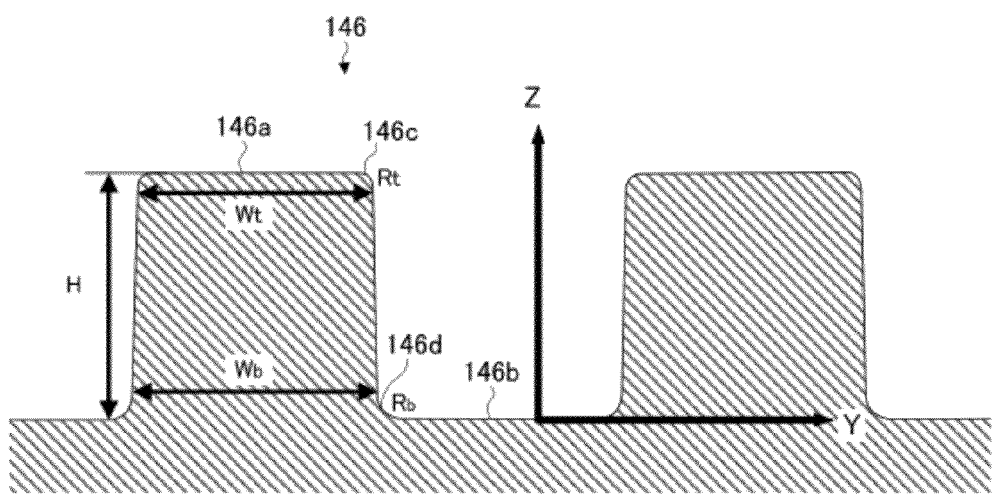
FIG. 9 A cross-sectional view of a specimen model in which lines and spaces are formed on its surface.

Based on the framework of the basic calculation described above, the structure factor of an actual nano-structure is given, and the X-ray scattering intensity is specifically performed. FIG. 9 is a cross-sectional view of a specimen model in which lines and spaces are formed on its surface. When the X-ray enters at a grazing angle close to a critical angle on the unit structures which are arranged at intervals sufficiently smaller than a coherent length and which are present on the surface, the X-ray is reflected off not only the bottom surface but also the upper surface of the unit structure. Then, an interference pattern that reflects the height H of the unit structure at an X-ray reflectivity pattern appears as if a thin film were formed on the surface.

Figure 10:
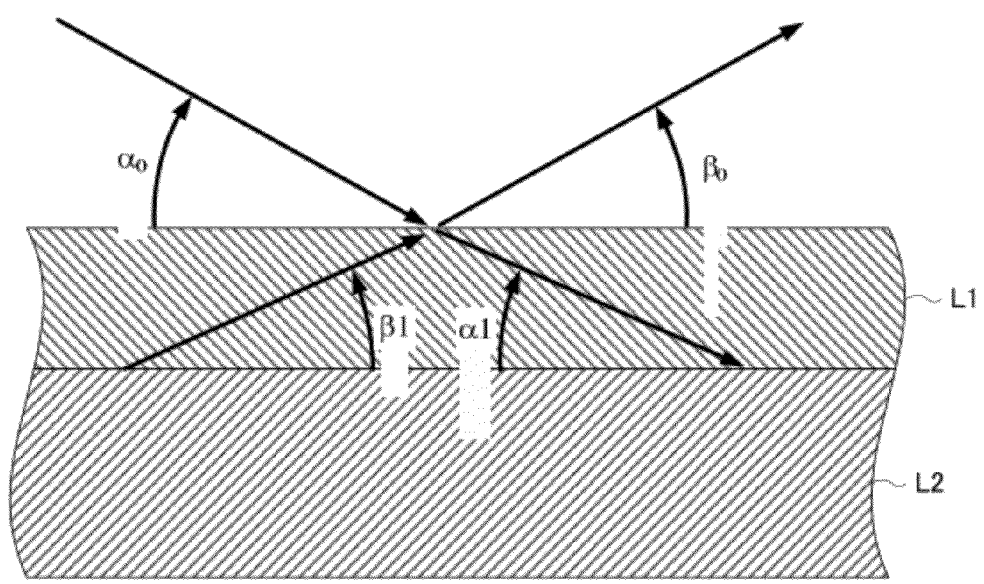
FIG. 10 A cross-sectional view showing a specimen model in which a layer structure is formed.

When consideration is given to this, it is found that, with respect to a structure which is formed on the surface at a high density, for example, it is necessary to calculate a surface electromagnetic field on a layer structure having a periodic structure in each layer and to deal with, based on it, the problem on the scattering from the surface structure. FIG. 10 is a cross-sectional view showing a specimen model in which a layer structure is formed. A reflected wave and a reflected wave on the surface will be described later, and a scattering amplitude when a scattering source having the potential V within the film indicated by formulas (25) to (27) is present will be described. For example, in order for the scattering amplitude of the surface shape shown in FIG. 9 to be calculated, the surface shape is first represented as the height Z (X, Y) of the surface at each point (X, Y). Although, in the example of FIG. 9, the unit structures are present only in the first layer, the unit structures may be generally present over a plurality of layers. When the unit structures are present over a plurality of layers on the surface, a scattering amplitude on the m-th layer (Lm) is expressed as follows.

[Formula 28]

$$\langle \tilde{\psi}_m^f(\beta)|V_m|\psi_m^f(\alpha)\rangle =$$

(28)

$$r_c P \tilde{T}_m T_m \begin{bmatrix} \int_0^{d_m} \theta(Z_m(X,Y) - z_m)e^{-ik_0(\eta_m + \zeta_m)z_m} dz_m \\ \int_{-\infty}^{\infty} e^{-iQ_y Y} dY \int_{-\infty}^{\infty} e^{-iQ_x X} dX + \\ \tilde{R}_m \int_0^{d_m} \theta(Z_m(X,Y) - z_m)e^{-ik_0(\eta_m - \zeta_m)z_m} dz_m \\ \int_{-\infty}^{\infty} e^{-iQ_y Y} dY \int_{-\infty}^{\infty} e^{-iQ_x X} dX + \\ R_m \int_0^{d_m} \theta(Z_m(X,Y) - z_m)e^{-ik_0(-\eta_m + \zeta_m)z_m} dz_m \\ \int_{-\infty}^{\infty} e^{-iQ_y Y} dY \int_{-\infty}^{\infty} e^{-iQ_x X} dX \\ \tilde{R}_m R_m \int_0^{d_m} \theta(Z_m(X,Y) - z_m)e^{-ik_0(-\eta_m - \zeta_m)z_m} dz_m \\ \int_{-\infty}^{\infty} e^{-iQ_y Y} dY \int_{-\infty}^{\infty} e^{-iQ_x X} dX \end{bmatrix}$$

where θ(x) is a step function that is expressed as follows.

[Formula 29]

$$\theta(x) = \begin{cases} 1 & x > 0 \\ 0 & x < 0 \end{cases} \quad (29)$$

Here, if $0 < Z_m(X, Y) < d_m$, the integration of $Z_m$ in formula (28) can be performed as follows.

[Formula 30]

$$\int_0^{d_m} \theta(Z_m(X,Y) - z_m) e^{-ik_0(\eta_m + \zeta_m) z_m} \, dz_m = \qquad (30)$$

$$\left[ \frac{\theta(Z_m(X,Y) - z_m) e^{-ik_0(\eta_m + \zeta_m) z_m}}{-ik_0(\eta_m + \zeta_m)} \right]_0^{d_m} +$$

$$\int_0^{d_m} \frac{\delta(Z_m(X,Y) - z_m) e^{-ik_0(\eta_m + \zeta_m) z_m}}{-ik_0(\eta_m + \zeta_m)} dz_m =$$

$$\theta(Z_m(X,Y) - z_m) e^{-ik_0(\eta_m + \zeta_m) z_m} -$$

$$\frac{\theta(Z_m(X,Y) - 0)}{-ik_0(\eta_m + \zeta_m)} - + \frac{e^{-ik_0(\eta_m + \zeta_m) Z_m(X,Y)}}{-ik_0(\eta_m + \zeta_m)} =$$

$$\frac{e^{-ik_0(\eta_m + \zeta_m) Z_m(X,Y)} - 1}{-ik_0(\eta_m + \zeta_m)}$$

Then, each term is assumed to be expressed by the following formula.

[Formula 31]

$$\begin{cases} G_m^{T\tilde{T}}(\eta_m, \zeta_m, Q_x, Q_y) = \int_s \frac{e^{-ik_0(\eta_m + \zeta_m) Z_m(X,Y)} - 1}{-ik_0(\eta_m + \zeta_m)} e^{-i(Q_x \cdot X + Q_y \cdot Y)} dX\, dY \\ G_m^{R\tilde{T}}(\eta_m, \zeta_m, Q_x, Q_y) = \int_s \frac{e^{-ik_0(-\eta_m + \zeta_m) Z_m(X,Y)} - 1}{-ik_0(-\eta_m + \zeta_m)} e^{-i(Q_x \cdot X + Q_y \cdot Y)} dX\, dY \\ G_m^{T\tilde{R}}(\eta_m, \zeta_m, Q_x, Q_y) = \int_s \frac{e^{-ik_0(\eta_m - \zeta_m) Z_m(X,Y)} - 1}{-ik_0(\eta_m - \zeta_m)} e^{-i(Q_x \cdot X + Q_y \cdot Y)} dX\, dY \\ G_m^{R\tilde{R}}(\eta_m, \zeta_m, Q_x, Q_y) = \int_s \frac{e^{-ik_0(-\eta_m - \zeta_m) Z_m(X,Y)} - 1}{-ik_0(-\eta_m - \zeta_m)} e^{-i(Q_x \cdot X + Q_y \cdot Y)} dX\, dY \end{cases} \quad (31)$$

Therefore, scattering amplitude formula (27) can be expressed as follows.

[Formula 32]

$$\langle \tilde{\psi}^f(\beta) | V | \psi^i(\alpha) \rangle = \qquad (32)$$

$$r_c P \sum_m T_m \tilde{T}_m \{ G_m^{T\tilde{T}} + R_m G_m^{R\tilde{T}} + \tilde{R}_m G_m^{T\tilde{R}} + R_m \tilde{R}_m G_m^{R\tilde{R}} \}$$

Furthermore, a case where the unit structures have periodicity in the y direction is considered. Such a case has been discussed with reference to formulas (7) to (17'). This is applied to specific calculation of formula (32). In order to generally deal with the surface nano-structure, for example, consider a case where a two-dimensional periodic structure is formed within the surface. Therefore, each point (X, Y) within the unit structures constituting the periodic structure is expressed as $(X, Y) = (X_j + x_j, Y_j + y_j)$ through the use of a local coordinate $(x_j, y_j)$ and the position coordinate $(X_j, Y_j)$ of each cell, and formula (31) is rewritten, with the result that the following formula is given.

[Formula 33]

$$G_m(Q_z^{am}, Q_x, Q_y) = \int_s \frac{e^{-iQ_z^{am} Z_m(X,Y)} - 1}{-iQ_z^{am}} e^{-i(Q_x \cdot X + Q_y \cdot Y)} dX\, dY \qquad (33)$$

$$= \sum_j \left[ \int_s \frac{e^{-iQ_z^{am} Z_{mj}(x_j, y_j)} - 1}{-iQ_z^{am}} e^{-i(Q_x \cdot x_j + Q_y \cdot y_j)} dx_j dy_j \right]$$

$$e^{-i(Q_x \cdot X_j + Q_y \cdot Y_j)}$$

$$= \sum_j F_{mj}(Q_z^{am}, Q_x, Q_y) e^{-i(Q_x \cdot X_j + Q_y \cdot Y_j)}$$

$$Q_z^{am} = \{ Q_z^{T_m \tilde{T}_m}, Q_z^{R_m \tilde{T}_m}, Q_z^{T_m \tilde{R}_m}, Q_z^{R_m \tilde{R}_m} \}$$

$$\begin{rcases} Q_z^{T_m \tilde{T}_m} = k_0(\eta_m + \zeta_m) \\ Q_z^{R_m \tilde{T}_m} = k_0(-\eta_m + \zeta_m) \\ Q_z^{T_m \tilde{R}_m} = k_0(\eta_m - \zeta_m) \\ Q_z^{R_m \tilde{R}_m} = k_0(-\eta_m - \zeta_m) \end{rcases} \begin{cases} \eta_m = \sqrt{n_m - \cos^2 \alpha} \\ \zeta_m = \sqrt{n_m - \cos^2 \beta} \end{cases} \qquad (34)$$

It should be noted that these have a large imaginary term in a total reflection region. Here, the integration part of a shape function $Z_{mj}(X_j, Y_j)$ in formula (33) is defined as the structure factor of the unit parts in a repetition structure as indicated in the following formula.

[Formula 34]

$$F_{mj}(Q_z^a, Q_{//}) \equiv \int_s \frac{e^{-iQ_z^a Z_{mj}(x_j, y_j)} - 1}{-iQ_z^a} e^{-i(Q_x \cdot x_j + Q_y \cdot y_j)} dx_j dy_j \qquad (35)$$

$$Q_{//} = (Q_x, Q_y)$$

When formula (32) is written with this, it is expressed as follow.

[Formula 35]

$$\langle \tilde{\psi}^f(\beta) | V | \psi^i(\alpha) \rangle = r_c P \sum_j \sum_m T_m \tilde{T}_m \qquad (36)$$

$$\begin{Bmatrix} F_{mj}(Q_z^{T_m \tilde{T}_m}) + R_m F_{mj}(Q_z^{R_m \tilde{T}_m}) + \\ \tilde{R}_m F_{mj}(Q_z^{T_m \tilde{R}_m}) + R_m \tilde{R}_m F_{mj}(Q_z^{R_m \tilde{R}_m}) \end{Bmatrix}$$

$$e^{-i(Q_x \cdot X_j + Q_y \cdot Y_j)}$$

$$= r_c P \sum_j F_j^{DWBA}(\alpha, \beta, Q_{11}) e^{-i(Q_x \cdot X_j + Q_y \cdot Y_j)}$$

$$F_j^{DWBA}(\alpha, \beta, Q_{//}) \equiv \qquad (37)$$

$$\sum_m T_m \tilde{T}_m \begin{Bmatrix} F_{mj}(Q_z^{T_m \tilde{T}_m}, Q_{//}) + R_m F_{mj}(Q_z^{R_m \tilde{T}_m}, Q_{//}) + \\ \tilde{R}_m F_{mj}(Q_z^{T_m \tilde{R}_m}, Q_{//}) + R_m \tilde{R}_m F_{mj}(Q_z^{R_m \tilde{R}_m}, Q_{//}) \end{Bmatrix}$$

Figure 11:
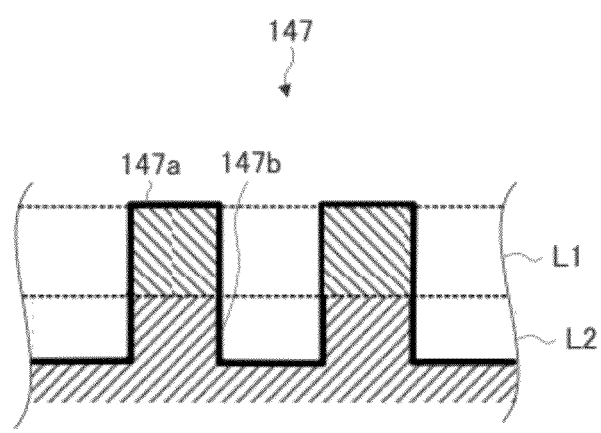
FIG. 11 A cross-sectional view showing a specimen model having a structure in which, as the height changes, material compositions differ.
Figure 12:
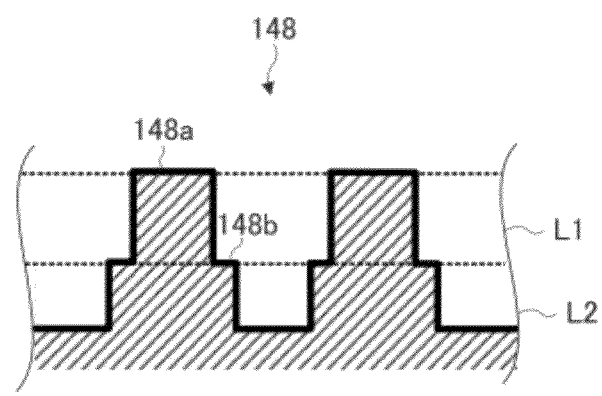
FIG. 12 A cross-sectional view showing a specimen model in which a convex portion has a step.
Figure 13:
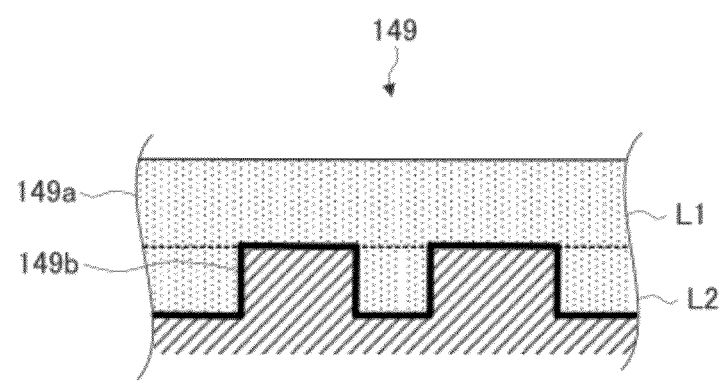
FIG. 13 A cross-sectional view showing a specimen model in which a new covering layer is formed on a microstructure.

Here, even if the microstructure formed on the surface is a one or more layer structure, the scattering amplitude can be calculated. The following structure is one example of the microstructure on which a plurality of layers is formed as described above. FIG. 11 is a cross-sectional view showing a specimen model 147 having a structure in which, as the height changes, material compositions differ. As shown in FIG. 11, in the specimen model 147, the material compositions of an end portion 147a of a convex portion and the material compositions of a base portion 147b of the convex portion and a substrate body portion differ from each other. By considering the end portion 147a as a layer L1, and the base portion 147b as a layer L2, the calculation becomes easy. FIG. 12 is a cross-sectional view showing a specimen model 148 having a step in the convex portion. As shown in FIG. 12, in the specimen model 148, the step is present between an end portion 148a of the convex portion and a base portion 148b of the convex portion. With respect to these, the end portion 148a can be considered as the layer L1, and the base portion 148b can be considered as layer L2. Furthermore, FIG. 13 is a cross-sectional view showing a specimen model 149 in which a covering layer 149a is newly formed on a microstructure 149b. In this case, the covering layer 149a can be considered as layer L1 and the microstructure 149b can be considered as layer L2. In such a case, a multilayer structure model is effective.

If there is a fluctuation in the periodical structure, when a sum with respect to j is acquired, the position coordinate of each cell is divided, as shown in the following formula, into an average position and a displacement resulting from the fluctuation, and thus a scattering cross section (scattering intensity) is calculated.

Average position $\bar{X}_j = (\bar{X}_j, \bar{Y}_j)$

Displacement $u(X_j) = (u_x(X_j, Y_j), u_y(X_j, Y_j))$ [Formula 36]

In this case, formulas (12'), (16'), (17') and the like can be applied without being processed.

[Formula 37]

$$I(\alpha, \beta, Q_{//}) = (r_c P)^2 N \left\{ \langle |F^{DWBA}|^2 \rangle + \right. \tag{38}$$

$$\left. |\langle F^{DWBA} \rangle|^2 \sum_{|k| \geq 1} \langle e^{-iQ_{//} \cdot (u(X_j) - u(X_k))} \rangle_j e^{-iQ_{//} \cdot (X_j - X_{j+k})} \right\}$$

$$I(\alpha, \beta, Q_{//}) = \tag{39}$$

$$(r_c P)^2 N \left\{ \langle |F^{DWBA}|^2 \rangle + |\langle F^{DWBA} \rangle|^2 e^{-\frac{Q_{//}^2 \Delta u^2}{2}} \sum_{|k| \geq 1} e^{-iQ_{//} \cdot (X_j - X_{j+k})} \right\}$$

$$I(\alpha, \beta, Q_{//}) = (r_c P)^2 N \left\{ \langle |F^{DWBA}|^2 \rangle + \right. \tag{40}$$

$$\left. |\langle F^{DWBA} \rangle|^2 \sum_{|k| \geq 1} e^{-iQ_{//} \cdot (X_j - X_{j+k})} e^{-\frac{Q_{//}^2}{2} a^2 \left(1 - \cos\left(2\pi \frac{|\Delta X_k|}{p}\right)\right)} \right\}$$

Figure 14:
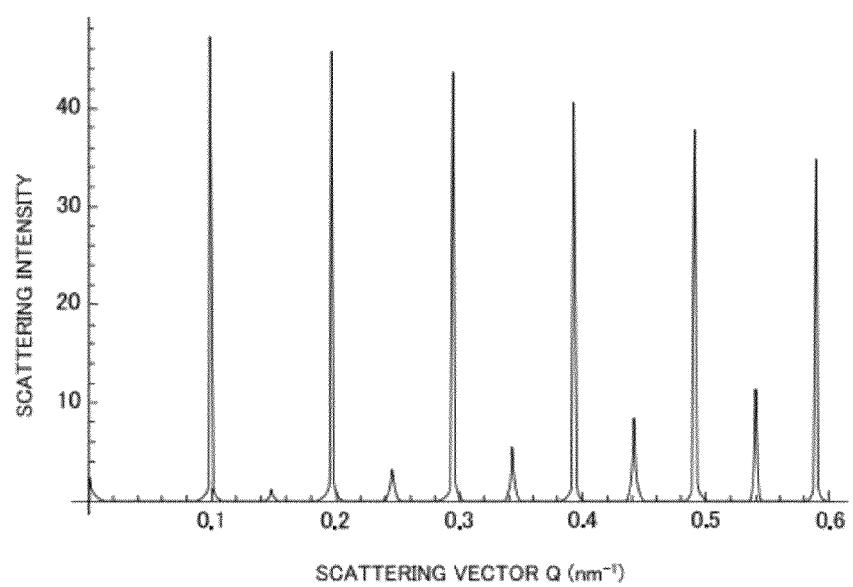
FIG. 14 A diagram showing a scattering intensity derived from part of the sum of periods calculated when a disturbance period is p=2.

$\langle F^{DWBA} \rangle$: the average value of $F^{DWBA}$ with respect to variations between the structure units j $\langle |F^{DWBA}|^2 \rangle$: the average value of $|F^{DWBA}|^2$ with respect to variations between the structure units j FIG. 14 is a diagram showing a scattering intensity output from a portion of a calculated periodical sum when, in the example of formula (40), the period of the disturbance is p=2. Peaks appearing in positions where the values of the scattering vector Q are the multiples of 0.1 result from the original periodic structure. Somewhat weak peaks appearing in the intermediate positions thereof result from the periodical displacement.

The specific calculation of the structure factor $F^{DWBA}$ that corresponds to the unit structure and that is expanded will now be described. Here, the expression "expanded" refers to the fact that, as indicated in formula (36), consideration is given to reflection and refraction on the surface based on DWBA; it should be noted that the structure factor $F^{DWBA}$ is a function that directly depends not only on the scattering vector Q but also on the incident angle α and the exit angle β. Since the elements of formula (36) are given by formula (35), some specific examples thereof will first be determined.

(Cylindrical Shape (Height H and Radius A))

Here, since the height of the cylinder is constantly H within the radius A, the following analytical solution can be obtained.

[Formula 38]

$$F_j(Q_z^a, Q_{//}) = \int_{r<a} \frac{e^{-iQ_z^a H} - 1}{-iQ_z^a} e^{-i(Q_x \cdot x_j + Q_y \cdot y_j)} dx_j dy_j = \tag{41}$$

$$\frac{e^{-iQ_z^a H} - 1}{-iQ_z^a} \int_0^{2\pi} d\theta \int_0^a r \, dr \, e^{-iQ_{//} \cdot r \cos\theta}$$

$$= 2\pi a \frac{e^{-iQ_z^a H} - 1}{-iQ_z^a} \frac{J_1(a \cdot Q_{//})}{Q_{//}} (Q_{//} = |Q_{//}|)$$

(One-Dimensional Trapezoidal Grating)

Then, consider a one-dimensional grating having an endlessly long trapezoidal shape in the x direction. Here, the integration can also be analytically performed, and the following shape factor can be obtained.

[Formula 39]

$$F_j(Q_z^a, Q_{//}) = \int_{-\frac{L_y}{2}}^{\frac{L_y}{2}} \frac{e^{-iQ_z^a z(y_j)} - 1}{-iQ_z^a} e^{-iQ_y \cdot y_j} dy_j \int_{-\infty}^{\infty} e^{-iQ_x \cdot x} dx \tag{42}$$

$$2\pi \delta(Q_x) \frac{1}{iQ_y} \left[ e^{-i\frac{W_b}{2} Q_y} \frac{e^{-i\left(Q_z^a - \frac{W_b - W_t}{2H} Q_y\right) H} - 1}{-i\left(Q_z^a - \frac{W_b - W_t}{2H} Q_y\right)} - \right.$$

$$\left. = e^{-i\frac{W_b}{2} Q_y} \frac{e^{-i\left(Q_z^a + \frac{W_b - W_t}{2H} Q_y\right) H} - 1}{-i\left(Q_z^a + \frac{W_b - W_t}{2H} Q_y\right)} \right]$$

where parameters of the trapezoid are the length Wt of the upper side, the length Wb of the lower side and the height H.

(Structure Factor in the Case of a Complicated Shape Function)

The above two examples are cases where the integration can be analytically performed. However, in general, such integration is not necessarily easy to perform. Therefore, a method that can be applied to a complicated shape is considered. For example, since, in a one-dimensional grating having the structure in which the gate structure of an LSI is modeled and which is shown in FIG. 9, it is impossible to perform analytical integration, it is necessary to calculate the shape factor of formula (35) by discretized numerical integration and to determine the scattering intensity. Here, from the viewpoint of actual use, it is necessary to perform the integration as effectively as possible. Before the calculation is specifically performed, the features of formulas (38) to (40) will be described. In each case, the diffraction peaks resulting from the periodic structure shown in FIG. 14 appear, and the X-ray scattering intensity reflecting the surface nano-structure is observed only in the diffraction peaks. Therefore, the calculation of the scattering intensity is preferably performed only at such a diffraction angle that the scattering vector $Q_\parallel$ parallel to the surface satisfies diffraction conditions $2L \sin\theta = h\lambda$. In this case, as shown below, it is possible to effectively use fast Fourier transformation (FFT) that is the Fourier transform of a periodic structure.

[Formula 40]

$$F_j(Q_z^a, Q_x, Q_y) = \int_{-\frac{L_Y}{2}}^{\frac{L_Y}{2}} \frac{e^{-iQ_z^a Z_j(y_j)} - 1}{-iQ_z^a} e^{-iQ_y \cdot y_j} dy_j \int_{-\infty}^{\infty} e^{-iQ_x \cdot x} dx \quad (43)$$

$$= 2\pi\delta(Q_x) \int_{-\frac{L_Y}{2}}^{\frac{L_Y}{2}} \frac{e^{-iQ_z^a Z_j(y_j)} - 1}{-iQ_z^a} e^{-iQ_y \cdot y_j} dy_j$$

$$\int_{-\frac{L_Y}{2}}^{\frac{L_Y}{2}} \frac{e^{-iQ_z^a Z_j(y)} - 1}{-iQ_z^a} e^{-iQ_y \cdot y_j} dy_j \Rightarrow \quad (44)$$

$$\sum_{s=-\frac{n-1}{2}}^{s=\frac{n-1}{2}} \frac{e^{-iQ_z^a Z_j(\Delta y \cdot s)} - 1}{-iQ_z^a} e^{-i(\Delta Q_y \cdot h)(\Delta y \cdot s)} \Delta y$$

$$F_j(Q_z^a, h) =$$

$$\Delta y \sum_{s=-\frac{n-1}{2}}^{s=\frac{n-1}{2}} \frac{e^{-iQ_z^a Z_j(\Delta y \cdot s)} - 1}{-iQ_z^a} e^{-2\pi i \frac{h \cdot s}{n}} \left( \Delta y = \frac{L_Y}{n}, \Delta Q_y = \frac{2\pi}{L_Y} \right)$$

($n, s, h$: Integer)

Here, it is found that, from formula (45) indicating the diffraction conditions and the definition, formula (46) gives diffraction peak positions.

[Formula 41]

$$Q_y = 4\pi \sin\theta/\lambda \quad (45)$$

$$\Delta Q_y \cdot h = 2\pi/L_Y \cdot h \quad (46)$$

Specifically, in a cross-sectional shape function $Z(y)$ that is given by FFT shown in formula (44), the scattering intensity in all the diffraction peak portions for the values of $Q_z^a$ can be calculated at one time. Although, in the above description, the one-dimensional grating that is endlessly continuous in the x direction is considered, when this is expanded to a two-dimensional structure $Z(x, y)$, formula below is given.

[Formula 42]

$$F_j(Q_z^a, Q_x, Q_y) = \quad (47)$$

$$\int_{-\frac{L_Y}{2}}^{\frac{L_Y}{2}} \int_{-\frac{L_X}{2}}^{\frac{L_X}{2}} \frac{e^{-iQ_z^a Z_j(x_j, y_j)} - 1}{-iQ_z^a} e^{-i(Q_x \cdot x_j + Q_y \cdot y_j)} dx_j dy_j \Rightarrow$$

$$\sum_{t=-\frac{m-1}{2}}^{t=\frac{m-1}{2}} \sum_{s=-\frac{n-1}{2}}^{s=\frac{n-1}{2}} \frac{e^{-iQ_z^a Z_j(\Delta x \cdot s, \Delta y \cdot t)} - 1}{-iQ_z^a}$$

$$e^{-i(\Delta Q_x \cdot h)(\Delta x \cdot s)} e^{-i(\Delta Q_y \cdot k)(\Delta y \cdot t)} \Delta x \Delta y$$

$$F_j(Q_z^a, h, k) =$$

$$\Delta x \Delta y \sum_{t=-\frac{m-1}{2}}^{t=\frac{m-1}{2}} \sum_{s=-\frac{n-1}{2}}^{s=\frac{n-1}{2}} \frac{e^{-iQ_z^a Z_j(\Delta x \cdot s, \Delta y \cdot t)} - 1}{-iQ_z^a} e^{-2\pi i \frac{h \cdot s}{n}} e^{-2\pi i \frac{k \cdot t}{m}}$$

$$\left( \Delta x = \frac{L_X}{n}, \Delta Q_x = \frac{2\pi}{L_X}, \Delta y = \frac{L_Y}{m}, \right.$$

$$\left. \Delta Q_y = \frac{2\pi}{L_Y}, n, m, s, t, h, k: \text{Integer} \right)$$

Figure 15:
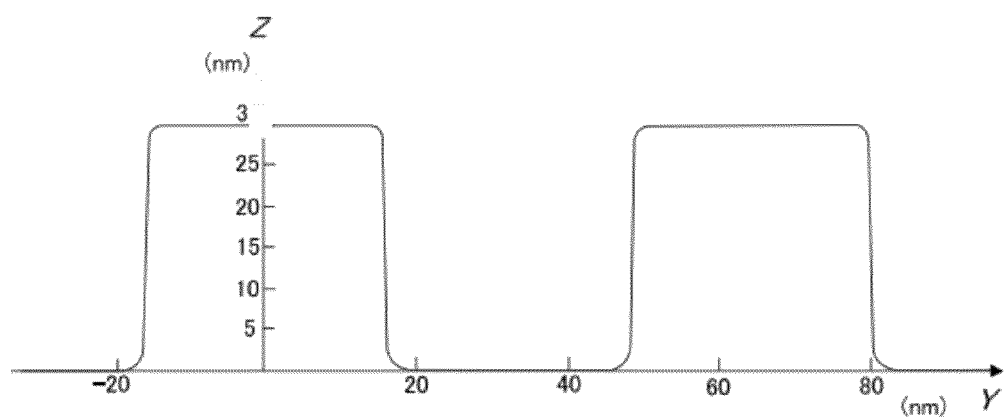
FIG. 15 A cross-sectional view of a specimen model having a line portion whose cross-sectional view is trapezoidal.
Figure 16:
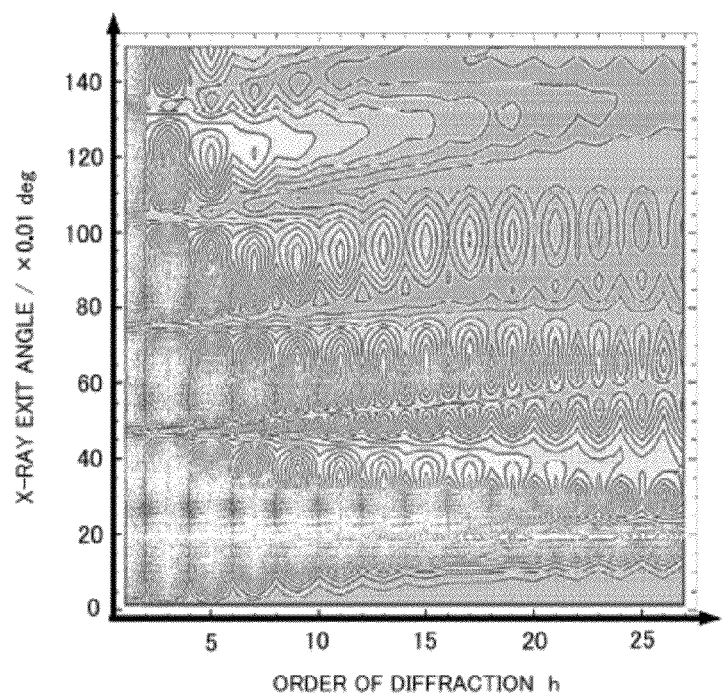
FIG. 16 A diagram showing the result of a simulation performed on the model of FIG. 15.
Figure 17:
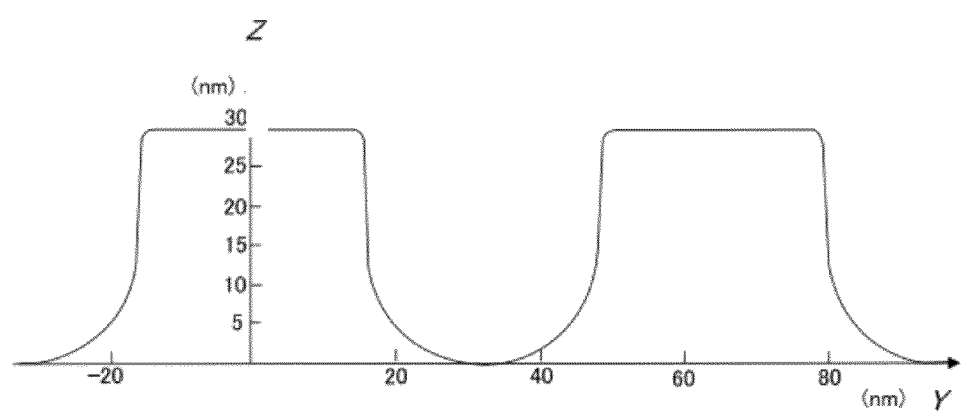
FIG. 17 A cross-sectional view showing a specimen model having a line portion whose cross-sectional view is trapezoidal.
Figure 18:
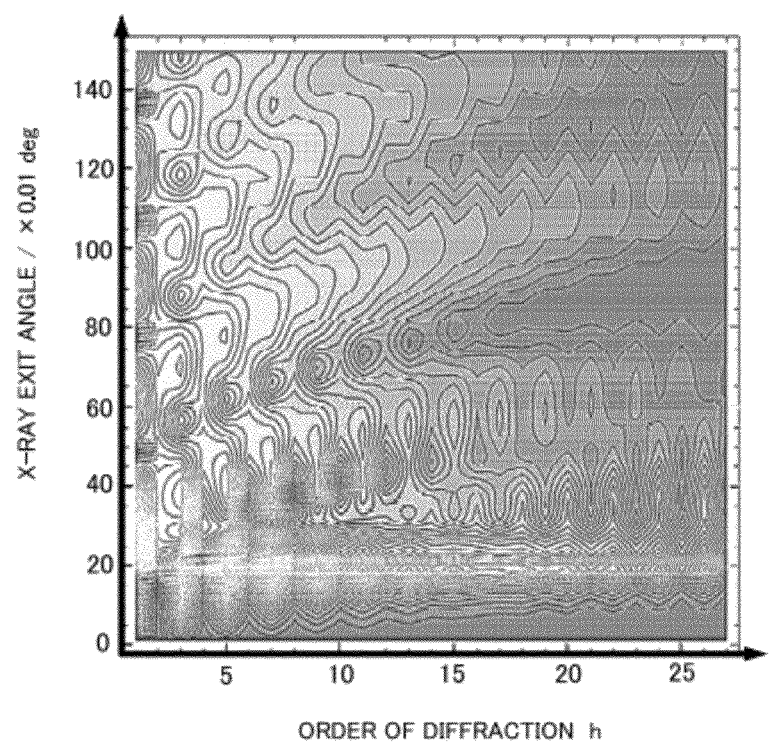
FIG. 18 A diagram showing the result of a simulation performed on the model of FIG. 17.

An example of the calculation of the scattering intensity, through the use of the calculation method with formula (47), when a complicated cross-sectional shape where the analytical integration shown in FIG. 9 cannot be performed is provided, is shown. Here, in consideration of not only the shape of the trapezoid but also the roundness of each edge, what effects are exerted on the scattering pattern is evaluated. FIGS. 15 and 17 are cross-sectional views of specimen models having a line portion whose cross section is trapezoidal. As compared with the model shown in FIG. 15, in the model shown in FIG. 17, the shape of the base portion is significantly changed. FIGS. 16 and 18 are respectively diagrams showing the results of simulations performed on the models shown in FIGS. 15 and 17. It can be recognized that the difference of the cross-sectional shape results in the significant difference of the scattering pattern.

(Specimen Model in which a Surface Layer is Covered with a Single Layer or a Plurality of Multiple Layers)

Figure 19:
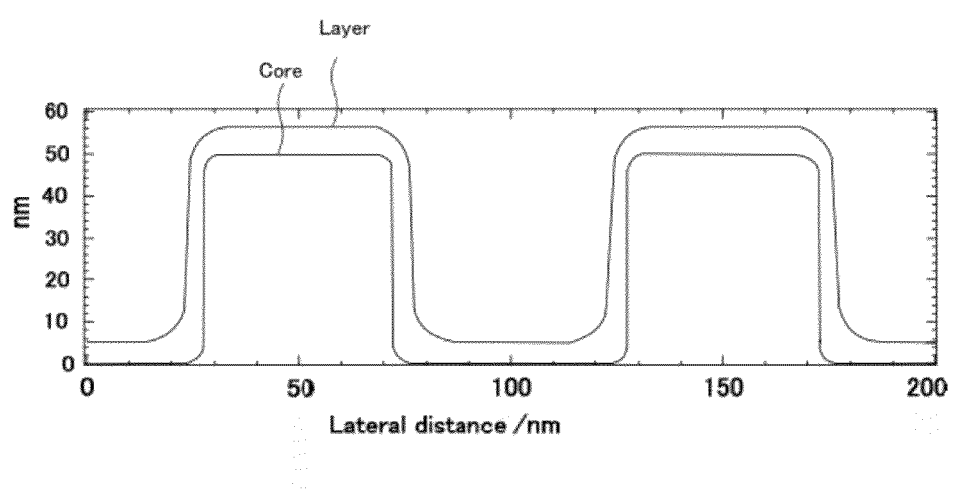
FIG. 19 A cross-sectional view of a specimen model having a line portion whose surface is covered by layers.
Figure 20:
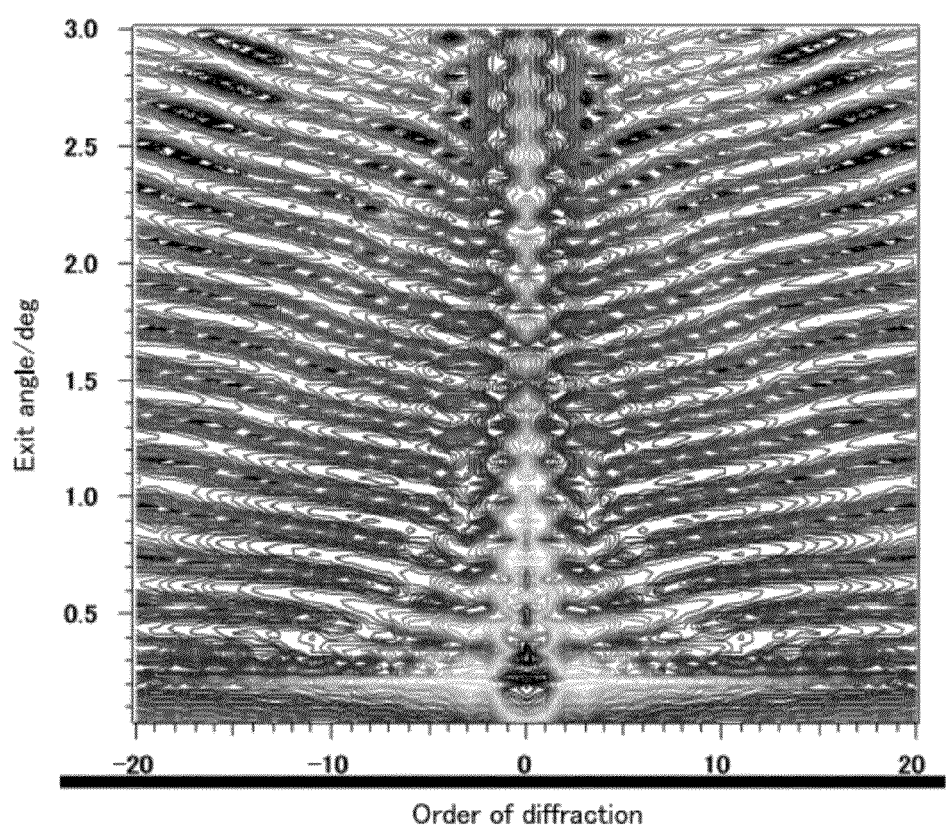
FIG. 20 A diagram showing the result of a simulation performed on the model of FIG. 19.

The method of using the structure factor in the complicated shape function described above can also be applied to a specimen model in which a surface layer is covered with a single layer or a plurality of multiple layers (films). FIG. 19 is a cross-sectional view of a specimen model having a line portion whose surface is covered with a layer. FIG. 20 is a diagram showing the result of a simulation performed on the model of FIG. 19. As shown in FIG. 20, in such a specimen model, a core portion (a first substantial region) in which trapezoids are uniformly formed in the parallel x direction and one or more layer portions (a second substantial region) that are formed in the shape of layers on the core portion are formed as the unit structure on the specimen surface. The material compositions of the layer portions are different from those of the core portion. The layer portions may be formed with a plurality of films. It is possible to calculate the X-ray scattering intensity on such a specimen model.

When, in the manufacturing process of various devices, a member that is formed by being coated with a barrier layer or a metal layer on a line and space structure is inspected, a thin film is preferably formed on a line, a side wall and a bottom portion such that the thickness of the film is as constant as possible. In this case, with the specimen model described above, it is possible to perform a nondestructive measurement on whether the film is uniformly formed on the line, the side wall and the bottom portion.

(Specimen Model Having a Line Portion where an Asymmetrical Side Wall is Formed)

Figure 21:
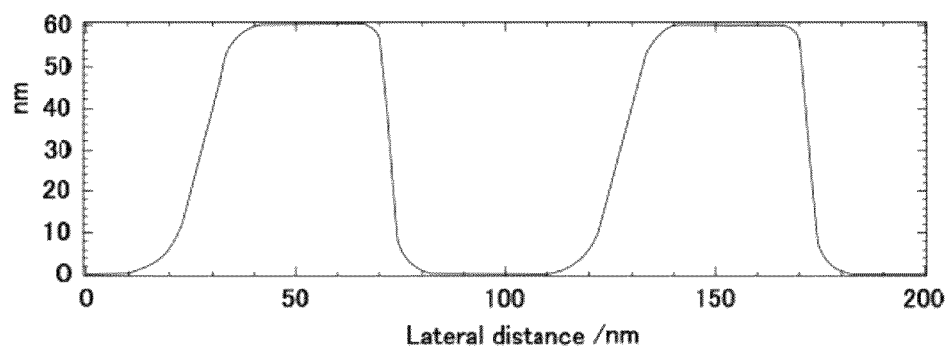
FIG. 21 A cross-sectional view showing a specimen model having a line portion in which an asymmetrical side wall is formed.
Figure 22:
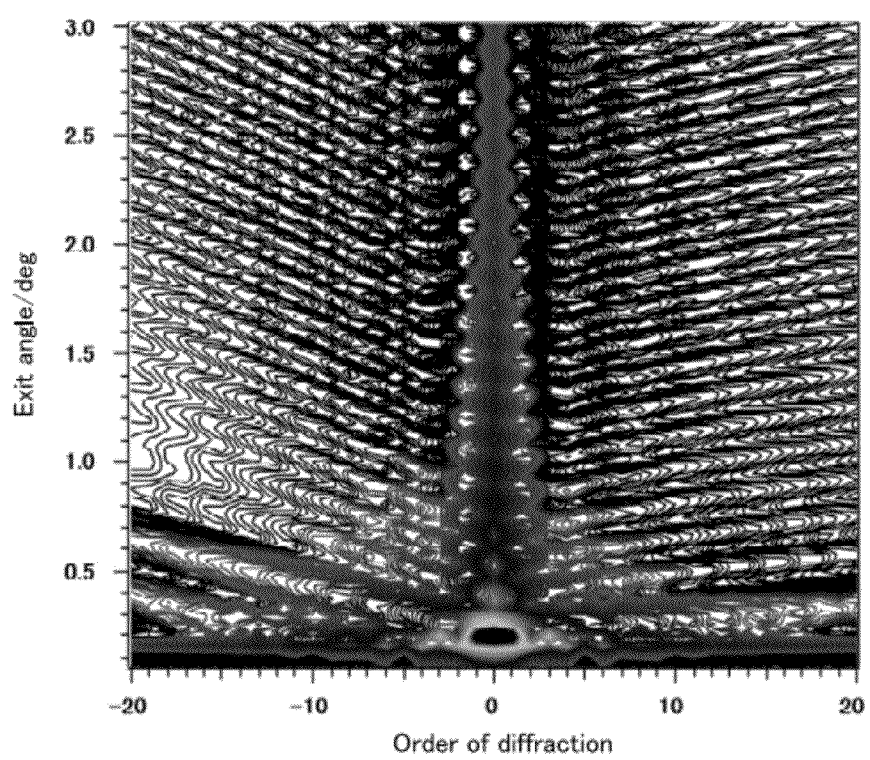
FIG. 22 A diagram showing the result of a simulation performed on the model of FIG. 21.

The method of using the structure factor in the complicated shape function can also be applied to a specimen model having a line portion in which an asymmetrical side wall is formed. FIG. 21 is a cross-sectional view of the specimen model having the line portion in which the asymmetrical side wall is formed. FIG. 22 is a diagram showing the result of a simulation performed on the model of FIG. 21. As shown in FIG. 21, even if the specimen model has the unit structure in which a cross-sectional shape perpendicular to the x direction parallel to the specimen surface is formed into asymmetrical trapezoids, it is possible to calculate the X-ray scattering intensity. In the above example, a line and space structure is uniformly formed in the x direction parallel to the specimen surface.

When lines are formed with a resist, the other portions are etched away, and thus a line and space structure is formed, an asymmetrical side wall structure may be formed by being anisotropically exposed to an etching gas or the like. Even in this case, with the specimen model described above, it is possible to have satisfactory detection sensitivity on the asymmetry of a side wall angle. Consequently, it is possible to very effectively utilize it as a monitor of a process in which concerns about asymmetry are expected.

EXAMPLES

Results of an Experiment

Figure 23:
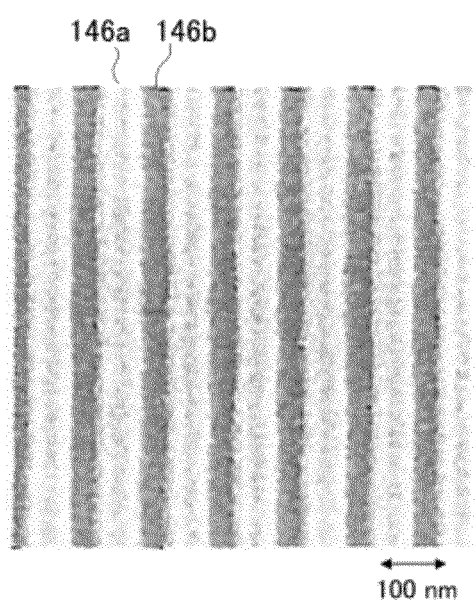
FIG. 23 A plan SEM photograph of a specimen.
Figure 24:
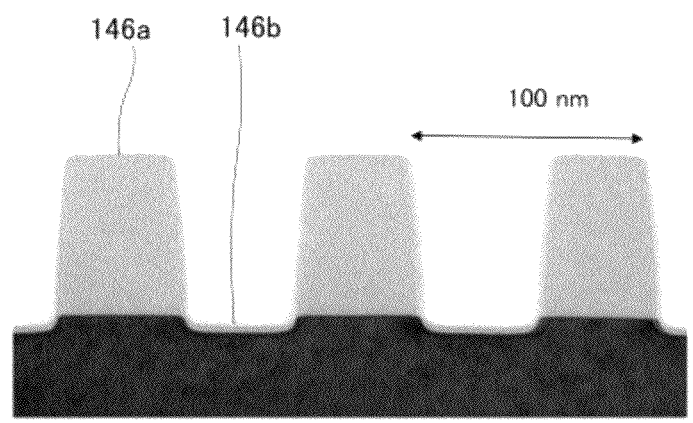
FIG. 24 A cross-sectional TEM photograph of a specimen.

An experiment was performed through the use of a specimen in which the unit structures have a repeated periodic structure. As the specimen, a specimen whose microstructure was determined to be accurate, that is, on which a calibration was performed, was used. FIGS. 23 and 24 are respectively a plan SEM photograph and a cross-sectional TEM photograph. As shown in FIGS. 23 and 24, on the surface of the specimen, line portions 146a having cross-sectional shapes that are uniform in the x direction are formed as repeated units such that they are regularly spaced in the y direction. That is, the cross-sectional shape on the YZ plane is analyzed. In addition, space portions 146b are formed between the line portions 146a. It can be found that the shape whose cross section is trapezoidal is not simply trapezoidal, but has round portions with a predetermined radius of curvature in a convex end portion 146c of an upper side and a concave base portion 146d.

Figure 25:
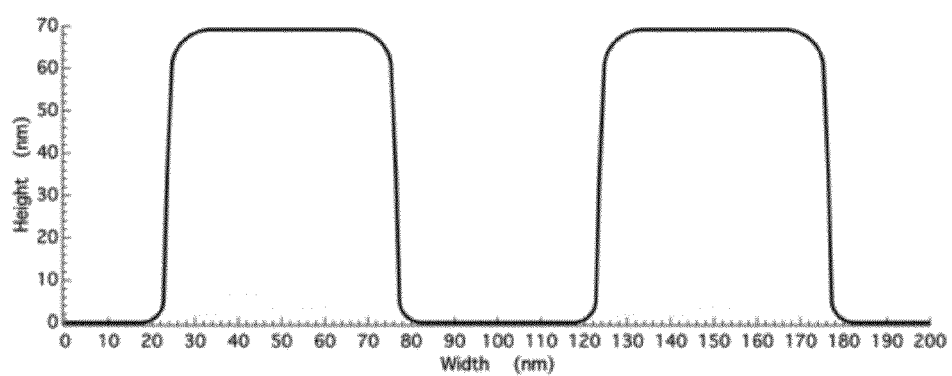
FIG. 25 A cross-sectional view of the specimen model of the specimens shown in FIGS. 23 and 24.

FIG. 25 is a diagram showing a cross section of a specimen model of the specimen described above. The diagram is represented such that, in addition to the features of the trapezoid such as the length of the upper side, the length of the lower side and the height, parameters for the radius of curvature of the convex end portion of the upper side and the radius of curvature of the concave base portion are introduced and that the radius of curvature of the round portions described above can be reflected.

Figure 26:
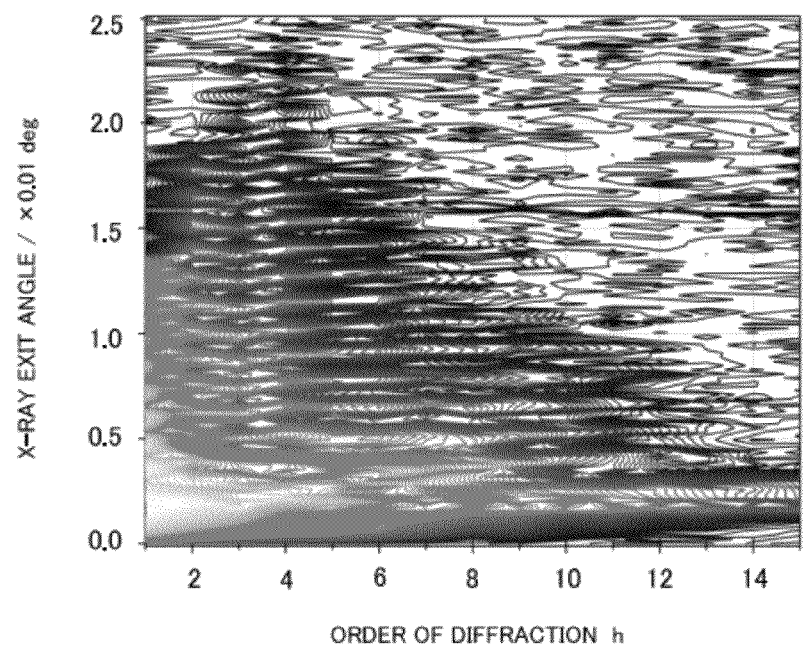
FIG. 26 A graph showing an X-ray scattering intensity that is actually measured.
Figure 27:
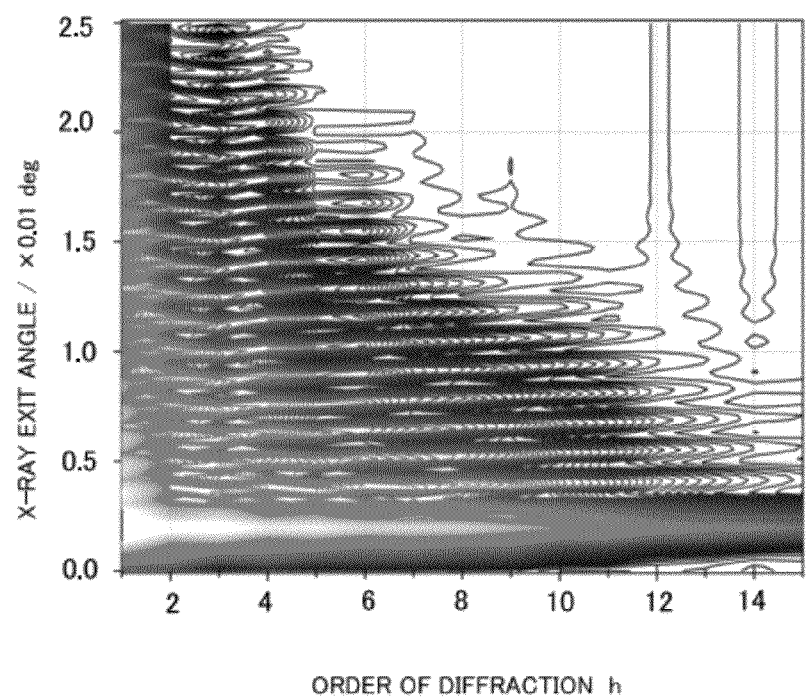
FIG. 27 A graph showing an X-ray scattering intensity that is calculated.

The X-ray scattering intensity was actually measured on the above specimen, the X-ray scattering intensity for the above specimen model was calculated, and thus the optimum values of the parameters were obtained by fitting. FIG. 26 is a graph showing the actually measured X-ray scattering intensity. In FIG. 26, portions having a high X-ray scattering intensity are indicated by white. In contrast, FIG. 27 is a graph showing an X-ray scattering intensity calculated by simulation through the use of the optimum parameters. As shown in FIGS. 26 and 27, it can be seen that the scattering intensity is approximately the same as each other.

Figure 28:
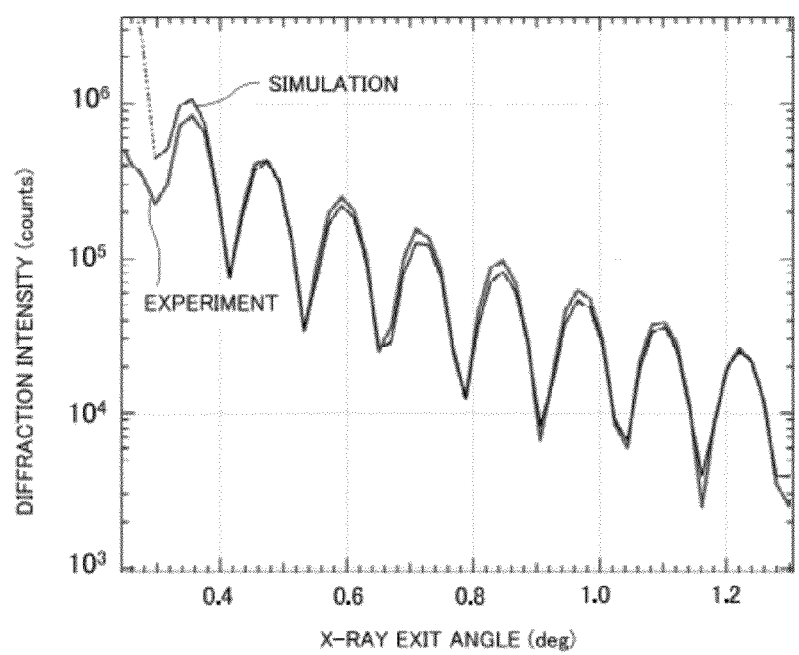
FIG. 28 A graph showing, with respect to the first peak, the X-ray scattering intensity actually measured and the X-ray scattering intensity calculated.
Figure 29:
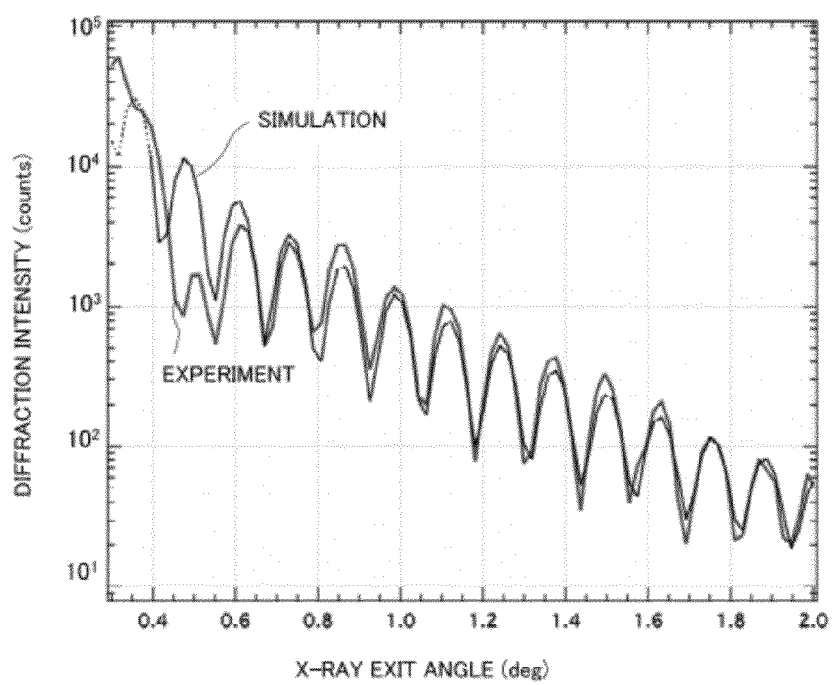
FIG. 29 A graph showing, with respect to the third peak, the X-ray scattering intensity actually measured and the X-ray scattering intensity calculated.
Figure 30:
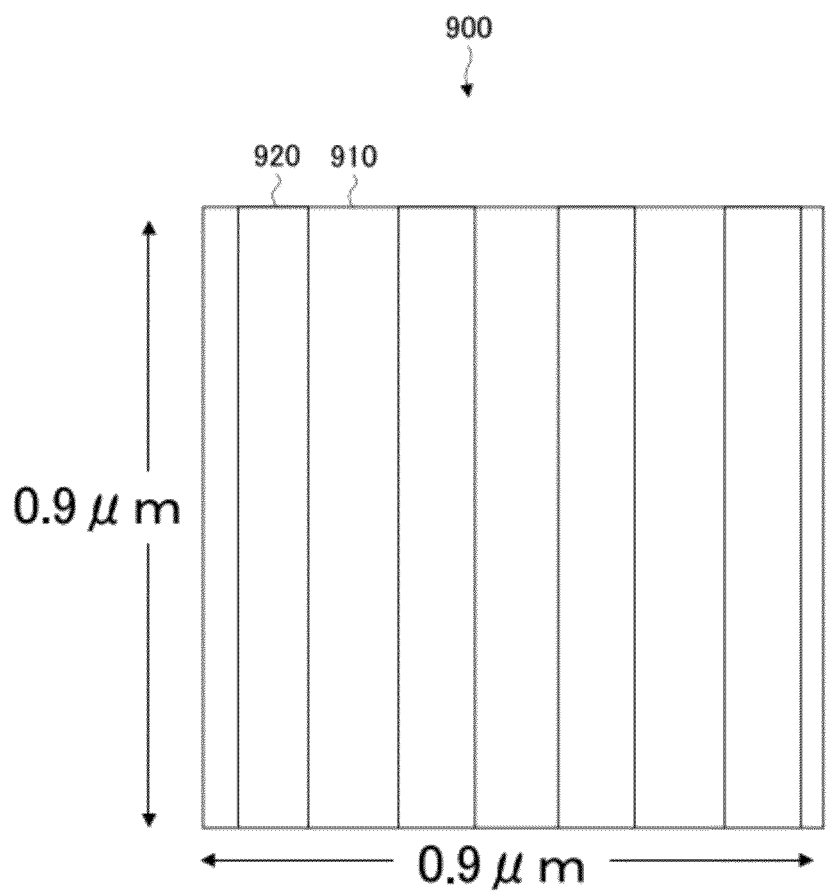
FIG. 30 A plan view showing an example of a semiconductor substrate.

FIGS. 28 and 29 are respectively graphs showing the actually measured X-ray scattering intensity and the calculated X-ray scattering intensity on the first and third peaks with respect to the above results. The figures show that the actually measured values and the calculated values are substantially equal to each other. As described above, it has been recognized that the cross-sectional shape within the y-z plane obtained by determining the parameters significantly agree with the cross-sectional TEM photograph shown in FIG. 24, and it has been recognized that the surface microstructure measurement method according to the present invention is effective.

100 Surface microstructure measurement system
110 X-ray scattering measurement device
113 Monochromater
114 and 115 Collimation block
115a Specimen stage
116 Two-dimensional detector
117 Beam stop
118 Slit
119 Knife edge
120 Surface microstructure analysis device
121 Parameter acquisition portion
122 Formula storage portion
123 Simulation portion
124 Fitting portion
125 Output portion
140 and 145 Specimen
141 and 146 Specimen surface
146a Line portions
146b Space portion
146c Convex end portion
146d Base portion
147, 148 and 149 Specimen model
147a and 148a End portion
147b and 148b Base portion
149a Covering layer
149b Microstructure

The invention claimed is:

1. A surface microstructure measurement method of measuring a microstructure on a specimen surface, the method comprising the steps of:
    irradiating said specimen surface with X-ray at a grazing incident angle and measuring a scattering intensity;
    assuming a specimen model with a microstructure on a surface in which one or more layers is formed in a direction perpendicular to said surface and unit structures are periodically arranged in a direction parallel to said surface within the layers, calculating a scattering intensity of X-ray scattered by said microstructure based on refractive indexes of respective layers of the one or more layers in the direction perpendicular to said surface, and fitting the scattering intensity of X-ray calculated by said specimen model to said measured scattering intensity; and
    determining, as a result of the fitting, an optimum value of a parameter for specifying a shape of said unit structures.

2. The surface microstructure measurement method according to claim 1, wherein
    said unit structures are formed by a uniform substantial region and a uniform vacant region within said layers, and the scattering intensity of said X-ray caused by said uniform substantial region is calculated.

3. The surface microstructure measurement method according to claim 2, wherein
by assuming that said unit structures have positional fluctuations from an exact periodical position and said positional fluctuations do not depend on a difference between mutual positions and are random, the scattering intensity of said X-ray is calculated.

4. The surface microstructure measurement method according to claim 2, wherein
by assuming that said unit structures have positional fluctuations from an exact periodical position and said positional fluctuations depend only on a relative positional relation between said unit structures, the scattering intensity of said X-ray is calculated.

5. The surface microstructure measurement method according to claim 4, wherein,
when the positional fluctuations of said unit structures have periodicity, by using an amplitude and a period of said positional fluctuations to express mean square of the positional fluctuations of said unit structures, the scattering intensity of said X-ray is calculated.

6. The surface microstructure measurement method according to claim 2, wherein,
in a specimen model in which said unit structures have said substantial region within a cylinder, the scattering intensity of said X-ray is calculated.

7. The surface microstructure measurement method according to claim 2, wherein,
in a specimen model in which said unit structures have said substantial region within a trapezoid that is uniform in an x direction parallel to said specimen surface, the scattering intensity of said X-ray is calculated.

8. The surface microstructure measurement method according to claim 2, wherein,
in a specimen model in which said unit structures have said uniform substantial region in an x direction parallel to said specimen surface and are divided into elements in a y direction parallel to said specimen surface and perpendicular to said x direction, an integral is approximated by a sum of said elements, and thus the scattering intensity of said X-ray is calculated.

9. The surface microstructure measurement method according to claim 8, wherein
a specimen model in which said unit structures have a substantial region having a uniform cross-sectional structure in said x direction is assumed, either a radius of curvature of a convex end portion of both ends of an upper side or a radius of curvature of a concave base portion of both ends of a lower side of said cross-sectional shape is included in a parameter, and thus the scattering intensity of said X-ray is calculated.

10. The surface microstructure measurement method according to claim 8, wherein,
in a specimen model in which said unit structures have a first substantial region formed in a shape of trapezoid that is uniform in said x direction and have one or more second substantial regions whose element of material is different from an element of material of said first substantial region and which are formed in layers on said first substantial region, the scattering intensity of said X-ray is calculated.

11. The surface microstructure measurement method according to claim 8, wherein,
in a specimen model in which said unit structure have said substantial region that is uniform in said x direction and in which a cross-sectional shape perpendicular to said x direction is asymmetrically trapezoidal, the scattering intensity of said X-ray is calculated.

12. The surface microstructure measurement method according to claim 2, wherein,
in a specimen model in which said unit structures have a substantial region having a periodic structure in each of an x direction parallel to said specimen surface and a y direction parallel to said specimen surface and perpendicular to said x direction and are divided into elements in said x and y directions parallel to said specimen surface, the scattering intensity of said X-ray of each of said elements is integrated by a sum of said elements.

13. The surface microstructure measurement method according to claim 1, wherein,
in consideration of effects of refraction and reflection produced by a plurality of multiple layers formed in said specimen model, the scattering intensity of the X-ray scattered by said microstructure is calculated.

14. A surface microstructure measurement data analysis method of measuring a microstructure on a specimen surface, the method causing a computer to execute the steps of:
assuming a specimen model with a microstructure on a surface in which one or more layers is formed in a direction perpendicular to said surface and unit structures are periodically arranged in a direction parallel to said surface within the layers, calculating a scattering intensity of X-ray scattered by said microstructure, in consideration of effects of refraction and reflection produced by said layers and based on refractive indexes of respective layers of the one or more layers in the direction perpendicular to said surface, and fitting the scattering intensity of X-ray calculated by said specimen model to a scattering intensity that is actually measured by irradiating said specimen surface with X-ray at a grazing incident angle; and
determining, as a result of the fitting, an optimum value of a parameter for specifying a shape of said unit structures.

15. A surface microstructure measurement system for measuring a microstructure on a specimen surface, the device comprising an X-ray scattering measurement device and a surface microstructure analysis device,
the X-ray scattering measurement device comprising:
a monochromater that spectrally reflects X-ray emitted from an X-ray source;
a slit portion that limits a spot size of said spectrally reflected X-ray on said specimen surface to 30 μm or less;
a specimen stage that rotates to change both an incident angle of said spectrally reflected X-ray on said specimen surface and rotates within a plane of said specimen surface, and which supports said specimen; and
a two-dimensional detector which measures the scattering intensity of the X-ray scattered on said specimen surface,
the surface microstructure analysis device comprising a computer, wherein
a simulation portion, performed by the computer, assuming a specimen model with a microstructure on a surface in which one or more layers is formed in a direction perpendicular to said surface and unit structures are periodically arranged in a direction parallel to said surface within the layers, calculates a scattering intensity of X-ray scattered by said microstructure based on refractive indexes of respective layers of the one or more layers in the direction perpendicular to said surface; and a fitting portion, performed by the computer, fits the scattering intensity of X-ray calculated by said specimen model to said measured scattering intensity, and determines, as a result of the fitting, an optimum value of a parameter for specifying a shape of said unit structures.

* * * * *